US012536968B2

(12) United States Patent
Li et al.

(10) Patent No.: US 12,536,968 B2
(45) Date of Patent: Jan. 27, 2026

(54) METHOD FOR DRIVING DISPLAY PANEL AND DISPLAY DEVICE

(71) Applicants: Hefei BOE Display Technology Co., Ltd., Anhui (CN); BOE Technology Group Co., Ltd., Beijing (CN)

(72) Inventors: Qing Li, Beijing (CN); Panhui Zhao, Beijing (CN); Liugang Zhou, Beijing (CN); Ke Dai, Beijing (CN); Jun Wang, Beijing (CN); Jianwei Sun, Beijing (CN); Yunyun Liang, Beijing (CN); Yanting Huang, Beijing (CN); Yu Quan, Beijing (CN); Yunlu Chen, Beijing (CN); Zhengru Pan, Beijing (CN); Jiantao Liu, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/579,433

(22) PCT Filed: Jan. 3, 2023

(86) PCT No.: PCT/CN2023/070192

§ 371 (c)(1),
(2) Date: Jan. 15, 2024

(87) PCT Pub. No.: WO2023/155628

PCT Pub. Date: Aug. 24, 2023

(65) Prior Publication Data

US 2024/0347016 A1 Oct. 17, 2024

(30) Foreign Application Priority Data

Feb. 17, 2022 (CN) ........................ 202210145069.8

(51) Int. Cl.
*G09G 3/36* (2006.01)

(52) U.S. Cl.
CPC ......... *G09G 3/3607* (2013.01); *G09G 3/3688* (2013.01); *G09G 2310/08* (2013.01); (Continued)

(58) Field of Classification Search
None
See application file for complete search history.

(56) References Cited

U.S. PATENT DOCUMENTS

2012/0249620 A1 10/2012 Choi et al.
2019/0139490 A1 5/2019 Bang et al.
(Continued)

FOREIGN PATENT DOCUMENTS

CN 103000154 A 3/2013
CN 103187031 A 7/2013
(Continued)

*Primary Examiner* — Andre L Matthews
(74) *Attorney, Agent, or Firm* — Nath, Goldberg & Meyer; Joshua B. Goldberg

(57) ABSTRACT

A method for driving a display panel and a display device, the method includes: acquiring an original grayscale value of each sub-pixel in an $m^{th}$ row and a target grayscale value corresponding to a data voltage input to each sub-pixel in an $(m-1)^{th}$ row m being an integer greater than 1; if, in a same column, the original grayscale value of the sub-pixel in the $m^{th}$ row is larger than the target grayscale value corresponding to the data voltage input to the sub-pixel in the $(m-1)^{th}$ row, determining a target grayscale value of each sub-pixel in the $m^{th}$ row according to the original grayscale value of the sub-pixel in the $m^{th}$ row and the target grayscale value of the sub-pixel in the $(m-1)^{th}$ row inputting a data voltage to a data line in the display panel according to the target grayscale value of each sub-pixel in the $m^{th}$ row.

17 Claims, 11 Drawing Sheets

(52) U.S. Cl.
CPC ............... *G09G 2320/0257* (2013.01); *G09G 2320/0271* (2013.01)

(56) References Cited

U.S. PATENT DOCUMENTS

| | | | | |
|---|---|---|---|---|
| 2020/0227006 | A1* | 7/2020 | Yao | G09G 3/006 |
| 2021/0027679 | A1 | 1/2021 | Kwon et al. | |
| 2021/0097947 | A1* | 4/2021 | Liu | G09G 3/3696 |
| 2021/0151005 | A1* | 5/2021 | Jiao | G09G 3/2011 |
| 2021/0295756 | A1* | 9/2021 | Hou | G09G 3/2011 |
| 2022/0189371 | A1* | 6/2022 | Xie | G09G 3/20 |

FOREIGN PATENT DOCUMENTS

| | | | |
|---|---|---|---|
| CN | 103489392 | A | 1/2014 |
| CN | 104243946 | B | 4/2017 |
| CN | 108831394 | A | 11/2018 |
| CN | 109859713 | A | 6/2019 |
| CN | 110390899 | A | 10/2019 |
| CN | 110544461 | A | 12/2019 |
| CN | 110648643 | A | 1/2020 |
| CN | 111028761 | A | 4/2020 |
| CN | 111223460 | A | 6/2020 |
| CN | 112397036 | A | 2/2021 |
| CN | 112581919 | A | 3/2021 |
| CN | 111768745 | B | 4/2021 |
| CN | 112669784 | A | 4/2021 |
| CN | 112951172 | A | 6/2021 |
| CN | 113192456 | A | 7/2021 |
| CN | 113284468 | A | 8/2021 |

* cited by examiner

| | 0 | 128 | 160 | 192 | 256 | 320 | 384 | 448 | 512 | 576 | 640 | 704 | 768 | 832 | 896 | 960 | 1023 |
|---|---|---|---|---|---|---|---|---|---|---|---|---|---|---|---|---|---|
| 0 | 512 | 512 | 512 | 512 | 512 | 512 | 512 | 512 | 512 | 512 | 512 | 512 | 512 | 512 | 512 | 512 | 512 |
| 128 | 504 | 512 | 512 | 512 | 512 | 512 | 512 | 512 | 512 | 512 | 512 | 512 | 512 | 512 | 512 | 512 | 512 |
| 160 | 502 | 510 | 512 | 512 | 512 | 512 | 512 | 512 | 512 | 512 | 512 | 512 | 512 | 512 | 512 | 512 | 512 |
| 192 | 500 | 508 | 510 | 512 | 512 | 512 | 512 | 512 | 512 | 512 | 512 | 512 | 512 | 512 | 512 | 512 | 512 |
| 256 | 496 | 504 | 506 | 508 | 512 | 512 | 512 | 512 | 512 | 512 | 512 | 512 | 512 | 512 | 512 | 512 | 512 |
| 320 | 493 | 500 | 502 | 504 | 508 | 512 | 512 | 512 | 512 | 512 | 512 | 512 | 512 | 512 | 512 | 512 | 512 |
| 384 | 489 | 496 | 498 | 500 | 504 | 508 | 512 | 512 | 512 | 512 | 512 | 512 | 512 | 512 | 512 | 512 | 512 |
| 448 | 485 | 493 | 495 | 496 | 500 | 504 | 508 | 512 | 512 | 512 | 512 | 512 | 512 | 512 | 512 | 512 | 512 |
| 512 | 481 | 489 | 491 | 493 | 496 | 500 | 504 | 508 | 512 | 512 | 512 | 512 | 512 | 512 | 512 | 512 | 512 |
| 576 | 477 | 485 | 487 | 489 | 493 | 496 | 500 | 504 | 508 | 512 | 512 | 512 | 512 | 512 | 512 | 512 | 512 |
| 640 | 473 | 481 | 483 | 485 | 489 | 493 | 496 | 500 | 504 | 508 | 512 | 512 | 512 | 512 | 512 | 512 | 512 |
| 704 | 469 | 477 | 479 | 481 | 485 | 489 | 493 | 496 | 500 | 504 | 508 | 512 | 512 | 512 | 512 | 512 | 512 |
| 768 | 465 | 473 | 475 | 477 | 481 | 485 | 489 | 493 | 496 | 500 | 504 | 508 | 512 | 512 | 512 | 512 | 512 |
| 832 | 462 | 469 | 471 | 473 | 477 | 481 | 485 | 489 | 493 | 496 | 500 | 504 | 508 | 512 | 512 | 512 | 512 |
| 896 | 458 | 465 | 467 | 469 | 473 | 477 | 481 | 485 | 489 | 493 | 496 | 500 | 504 | 508 | 512 | 512 | 512 |
| 960 | 454 | 462 | 464 | 465 | 469 | 473 | 477 | 481 | 485 | 489 | 493 | 496 | 500 | 504 | 508 | 512 | 512 |
| 1023 | 450 | 458 | 460 | 462 | 466 | 469 | 473 | 477 | 481 | 485 | 489 | 493 | 497 | 500 | 504 | 508 | 512 |

Fig. 10

| | 0 | 128 | 160 | 192 | 256 | 320 | 384 | 448 | 512 | 576 | 640 | 704 | 768 | 832 | 896 | 960 | 1023 |
|---|---|---|---|---|---|---|---|---|---|---|---|---|---|---|---|---|---|
| 0 | 512 | 512 | 512 | 512 | 512 | 512 | 512 | 512 | 512 | 512 | 512 | 512 | 512 | 512 | 512 | 512 | 512 |
| 128 | 512 | 512 | 512 | 512 | 512 | 512 | 512 | 512 | 512 | 512 | 512 | 512 | 512 | 512 | 512 | 512 | 512 |
| 160 | 512 | 512 | 512 | 512 | 512 | 512 | 512 | 512 | 512 | 512 | 512 | 512 | 512 | 512 | 512 | 512 | 512 |
| 192 | 512 | 512 | 512 | 512 | 512 | 512 | 512 | 512 | 512 | 512 | 512 | 512 | 512 | 512 | 512 | 512 | 512 |
| 256 | 512 | 512 | 512 | 512 | 512 | 512 | 512 | 512 | 512 | 512 | 512 | 512 | 512 | 512 | 512 | 512 | 512 |
| 320 | 512 | 512 | 512 | 512 | 512 | 512 | 512 | 512 | 512 | 512 | 512 | 512 | 512 | 512 | 512 | 512 | 512 |
| 384 | 512 | 512 | 512 | 512 | 512 | 512 | 512 | 512 | 512 | 512 | 512 | 512 | 512 | 512 | 512 | 512 | 512 |
| 448 | 512 | 512 | 512 | 512 | 512 | 512 | 512 | 512 | 512 | 512 | 512 | 512 | 512 | 512 | 512 | 512 | 512 |
| 512 | 512 | 512 | 512 | 512 | 512 | 512 | 512 | 512 | 512 | 512 | 512 | 512 | 512 | 512 | 512 | 512 | 512 |
| 576 | 512 | 512 | 512 | 512 | 512 | 512 | 512 | 512 | 512 | 512 | 512 | 512 | 512 | 512 | 512 | 512 | 512 |
| 640 | 512 | 512 | 512 | 512 | 512 | 512 | 512 | 512 | 512 | 512 | 512 | 512 | 512 | 512 | 512 | 512 | 512 |
| 704 | 512 | 512 | 512 | 512 | 512 | 512 | 512 | 512 | 512 | 512 | 512 | 512 | 512 | 512 | 512 | 512 | 512 |
| 768 | 512 | 512 | 512 | 512 | 512 | 512 | 512 | 512 | 512 | 512 | 512 | 512 | 512 | 512 | 512 | 512 | 512 |
| 832 | 512 | 512 | 512 | 512 | 512 | 512 | 512 | 512 | 512 | 512 | 512 | 512 | 512 | 512 | 512 | 512 | 512 |
| 896 | 512 | 512 | 512 | 512 | 512 | 512 | 512 | 512 | 512 | 512 | 512 | 512 | 512 | 512 | 512 | 512 | 512 |
| 960 | 512 | 512 | 512 | 512 | 512 | 512 | 512 | 512 | 512 | 512 | 512 | 512 | 512 | 512 | 512 | 512 | 512 |
| 1023 | 512 | 512 | 512 | 512 | 512 | 512 | 512 | 512 | 512 | 512 | 512 | 512 | 512 | 512 | 512 | 512 | 512 |

Fig. 11

METHOD FOR DRIVING DISPLAY PANEL AND DISPLAY DEVICE

CROSS-REFERENCE TO RELATED APPLICATIONS

This is a National Phase Application filed under 35 U.S.C. 371 as a national stage of PCT/CN2023/070192, filed Jan. 3, 2023, an application claiming the benefit of Chinese Application No. 202210145069.8, filed Feb. 17, 2022, the contents of each of which are hereby incorporated by reference in their entirety.

TECHNICAL FIELD

The present disclosure relates to the field of display technology, and in particular, to a method for driving a display panel and a display device.

BACKGROUND

In a display panel such as a Liquid Crystal Display (LCD) panel or an Organic Light-Emitting Diode (OLED) panel, a plurality of pixel units are generally provided. Each pixel unit may include a red sub-pixel, a green sub-pixel, and a blue sub-pixel. Brightness corresponding to respective sub-pixels is controlled so as to mix the colors displayed by the sub-pixels into an desired color to display a color image.

SUMMARY

An embodiment of the present disclosure provides a method for driving a display panel, including:

acquiring an original grayscale value of each sub-pixel in an $m^{th}$ row and a target grayscale value corresponding to a data voltage input to each sub-pixel in an $(m-1)^{th}$ row, where m is an integer greater than 1, and the display panel adopts a column inversion driving mode;

in a case where, in a same column, the original grayscale value of the sub-pixel in the $m^{th}$ row is larger than the target grayscale value corresponding to the data voltage input to the sub-pixel in the $(m-1)^{th}$ row, determining a target grayscale value of each sub-pixel in the $m^{th}$ row according to the original grayscale value of the sub-pixel in the $m^{th}$ row and the target grayscale value of the sub-pixel in the $(m-1)^{th}$ row in the same column as the sub-pixel in the $m^{th}$ row; and inputting a data voltage to a data line in the display panel according to the target grayscale value of each sub-pixel in the $m^{th}$ row so as to charge a corresponding data voltage into each sub-pixel in the $m^{th}$ row.

In some examples, the determining the target grayscale value of each sub-pixel in the $m^{th}$ row according to the original grayscale value of the sub-pixel in the $m^{th}$ row and the target grayscale value of the sub-pixel in the $(m-1)^{th}$ row in the same column as the sub-pixel in the $m^{th}$ row includes:

determining, for an $n^{th}$ column, a grayscale difference between the original grayscale value of the sub-pixel in the $m^{th}$ row and the target grayscale value of the sub-pixel in the $(m-1)^{th}$ row, where n is an integer greater than 0;

in a case where an absolute value of the grayscale difference corresponding to the $n^{th}$ column is larger than a preset threshold, reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and a target lookup grayscale value in a pre-stored target lookup table and determining the reduced original grayscale value of the sub-pixel in the $m^{th}$ row and in the $n^{th}$ column as a target grayscale value of the sub-pixel in the $m^{th}$ row and in the $n^{th}$ column; where the target look-up table includes: a plurality of first grayscale values different from each other, a plurality of second grayscale values different from each other and target lookup grayscale values each corresponding to any one of the first grayscale values and any one of the second grayscale values.

In some examples, the preset threshold is greater than 1 and less than or equal to a maximum grayscale value.

In some examples, the reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the target lookup grayscale value in a pre-stored target lookup table and determining the reduced original grayscale value of the sub-pixel in the $m^{th}$ row and in the $n^{th}$ column as the target grayscale value of the sub-pixel in the $m^{th}$ row and in the $n^{th}$ column includes:

determining, in the target lookup table, a target lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column;

determining a target grayscale conversion value corresponding to the sub-pixel in the $m^{th}$ row and in the $n^{th}$ row according to the determined target lookup grayscale value, a first setting value and a second setting value; and determining, after reducing the original grayscale value of the sub-pixel in the $m^{th}$ row and in the $n^{th}$ column by an absolute value of the target grayscale conversion value, the reduced original grayscale value of the sub-pixel in the $m^{th}$ row and in the $n^{th}$ column as the target grayscale value of the sub-pixel in the $m^{th}$ row and in the $n^{th}$ column.

In some examples, the determining a target grayscale conversion value corresponding to the sub-pixel in the $m^{th}$ row and in the $n^{th}$ row according to the determined target lookup grayscale value, a first setting value and a second setting value includes:

determining a first grayscale conversion value corresponding to the sub-pixel in the $m^{th}$ row and in the $n^{th}$ column according to the determined target lookup grayscale value, the first setting value and the second setting value by adopting the following formula;

$$Z11 = (Y11 - A11)/A12;$$

wherein Z11 represents the first grayscale conversion value, Y11 represents the target lookup grayscale value, A11 represents the first setting value, A12 represents the second setting value, $A12=2^k$, k representing a difference between a number of bits of grayscale corresponding to the target lookup table and a number of bits of grayscale corresponding to the display panel, and Y11 is less than or equal to A11; and rounding the first grayscale conversion value according to a rounding rule to determine the target grayscale conversion value.

In some examples, an overdrive lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column is determined in a pre-stored overdrive lookup table, and the determined overdrive lookup grayscale value is determined as the first setting value, wherein the overdrive lookup table includes: a plurality of first grayscale values different from each other, a plurality of second grayscale values different from each other and overdrive lookup grayscale values each corresponding to any one of the first grayscale values and any one of the second grayscale values.

In some examples, in a case where the absolute value of the grayscale difference corresponding to the $n^{th}$ column is not greater than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

In some examples, in a case where the absolute value of the grayscale difference corresponding to the $n^{th}$ column is not greater than the preset threshold, a compensation voltage corresponding to the sub-pixel in the $m^{th}$ row and in the $n^{th}$ column is determined according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table;

the inputting a data voltage to a data line in the display panel according to the target grayscale value of each sub-pixel in the $m^{th}$ row includes:

loading the compensation voltage corresponding to the sub-pixel in the $m^{th}$ row and in the $n^{th}$ column to the data line connected with the sub-pixel in the $m^{th}$ row and in the $n^{th}$ column while inputting the data voltage to the data line connected with the sub-pixel in the $m^{th}$ row and in the $n^{th}$ column according to the target grayscale value of the sub-pixel in the $m^{th}$ row and in the $n^{th}$ column.

In some examples, the determining a compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table includes: determining, in the overdrive lookup table, the overdrive lookup grayscale value corresponding to the original grayscale value of the sub-pixel in the $m^{th}$ row and in the $n^{th}$ column and the target grayscale value of the sub-pixel in the $(m_{-1})^{th}$ row and in the $n^{th}$ column;

determining a target overdrive grayscale conversion value corresponding to the sub-pixel in the $m^{th}$ row and in the $n^{th}$ column according to the determined overdrive lookup grayscale value, a third setting value and a fourth setting value; and determining a data voltage corresponding to an absolute value of the target overdrive grayscale conversion value of the sub-pixel in the $m^{th}$ row and in the $n^{th}$ column as the compensation voltage corresponding to the sub-pixel in the $m^{th}$ row and in the $n^{th}$ column.

In some examples, the determining a target overdrive grayscale conversion value corresponding to the sub-pixel in the $m^{th}$ row and in the $n^{th}$ column according to the determined overdrive lookup grayscale value, a third setting value and a fourth setting value includes:

determining a second grayscale conversion value corresponding to the sub-pixel in the $m^{th}$ row and in the $n^{th}$ column according to the determined overdrive lookup grayscale value, the third setting value and the fourth setting value by adopting the following formula;

$$Z21=(Y21-A22)/A21;$$

wherein, Z21 represents the second grayscale conversion value, Y21 represents the overdrive lookup grayscale value, A22 represents the fourth setting value, A21 represents the third setting value, and $A21=2^k$, k representing a difference between the number of bits of grayscale corresponding to the overdrive lookup table and the number of bits of grayscale corresponding to the display panel; and rounding the second grayscale conversion value according to a rounding rule to determine the target overdrive grayscale conversion value.

In some examples, the acquiring the original grayscale value of each sub-pixel in the $m^{th}$ row includes:

receiving an original display data of each sub-pixel in the $m^{th}$ row; and determining the original grayscale value of the sub-pixel in the $m^{th}$ row according to the original display data of the sub-pixel in the $m^{th}$ row.

An embodiment of the present disclosure provides a display device, including:

a display panel including a source driving circuit;

a timing controller configured to: determine an original grayscale value of each sub-pixel in the $m^{th}$ row and a target grayscale value corresponding to a data voltage input to each sub-pixel in the $(m-1)^{th}$ row; determine, in a case where the original grayscale value of the sub-pixel in the $m^{th}$ row is larger than the target grayscale value corresponding to the data voltage input to the sub-pixel in the $(m-1)^{th}$ row in the same column as the sub-pixel in the $m^{th}$ row, a target grayscale value of each sub-pixel in the $m^{th}$ row according to the original grayscale value of sub-pixel in the $m^{th}$ row and the target grayscale value of the sub-pixel in the $(m-1)^{th}$ row in the same column as the sub-pixel in the $m^{th}$ row; and provide the determined target grayscale value to the source driving circuit, where m is an integer greater than 1, and the display panel adopts a column inversion driving mode;

the source driving circuit is configured to: input a data voltage to a data line in the display panel according to the target grayscale value of each sub-pixel in the $m^{th}$ row so as to charge a corresponding data voltage into the sub-pixel in the $m^{th}$ row.

In some examples, the timing controller includes an image quality function processing module, the image quality function processing module storing a target lookup table and an overdrive lookup table;

the target lookup table includes: a plurality of first grayscale values different from each other, a plurality of second grayscale values different from each other, and target lookup grayscale values each corresponding to any one of the first grayscale values and any one of the second grayscale values;

the overdrive lookup table includes: a plurality of first grayscale values different from each other, a plurality of second grayscale values different from each other and overdrive lookup grayscale values each corresponding to any one of the first grayscale values and any one of the second grayscale values.

In some examples, two target lookup table are provided; the image quality function processing module includes: a first determining module, a second determining module and a data buffer;

the first determining module is configured to: store one of the two target lookup tables; reduce the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ column and in the $n^{th}$ column and the target lookup grayscale value in the target lookup table stored in advance and determine the reduced original grayscale value of the sub-pixel in the $m^{th}$ row and in the $n^{th}$ column as a target grayscale value of the sub-pixel in the $m^{th}$ row and in the $n^{th}$ column; and provide the determined target grayscale value to the source driving circuit, wherein n is an integer greater than 0;

the second determining module is configured to: store the other of the two target lookup tables, reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column and a target lookup grayscale value in the target lookup table stored in advance and determine the reduced original grayscale value of the sub-pixel in the $m^{th}$ row and in the $n^{th}$ column as a target grayscale value of the sub-pixel in the $m^{th}$ row and in the $n^{th}$ column; and provide the determined target grayscale value to the data buffer;

the data buffer is configured to store the target grayscale value output by the second determining module.

In some examples, the first determining module is further configured to acquire the target grayscale value corresponding to the data voltage input to each sub-pixel in the $(m-1)^{th}$ row in the data buffer; and the second determining module is further configured to acquire the target grayscale value corresponding to the data voltage input to each sub-pixel in the $(m-1)^{th}$ row in the data buffer.

In some examples, the timing controller further includes: an original grayscale processing module;

the original grayscale processing module is configured to determine, in a case where an absolute value of a grayscale difference corresponding to the $n^{th}$ row is not greater than a preset threshold, the original grayscale value of the sub-pixel in the $m^{th}$ row and in the $n^{th}$ column as the target grayscale value corresponding to the sub-pixel in the $m^{th}$ row and in the $n^{th}$ column.

In some examples, the timing controller further includes: an overdrive processing module, the overdrive processing module being configured to: store the overdrive lookup table; determine, in a case where the absolute value of the grayscale difference corresponding to the $n^{th}$ column is not greater than the preset threshold, a compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and an overdrive lookup grayscale value in the overdrive lookup table stored in advance; and the source driving circuit is configured to load the compensation voltage corresponding to the sub-pixel in the $m^{th}$ row and in the $n^{th}$ column to the data line connected with the sub-pixel in the $m^{th}$ row and in the $n^{th}$ column while inputting the data voltage to the data line connected with the sub-pixel in the $m^{th}$ row and in the $n^{th}$ column according to the target grayscale value of the sub-pixel in the $m^{th}$ row and in the $n^{th}$ column.

BRIEF DESCRIPTION OF DRAWINGS

FIG. 10 is a schematic diagram of a target look-up table according to an embodiment of the present disclosure;

FIG. 11 is a schematic diagram of an overdrive lookup table according to an embodiment of the present disclosure.

DETAIL DESCRIPTION OF EMBODIMENTS

Figure 1:
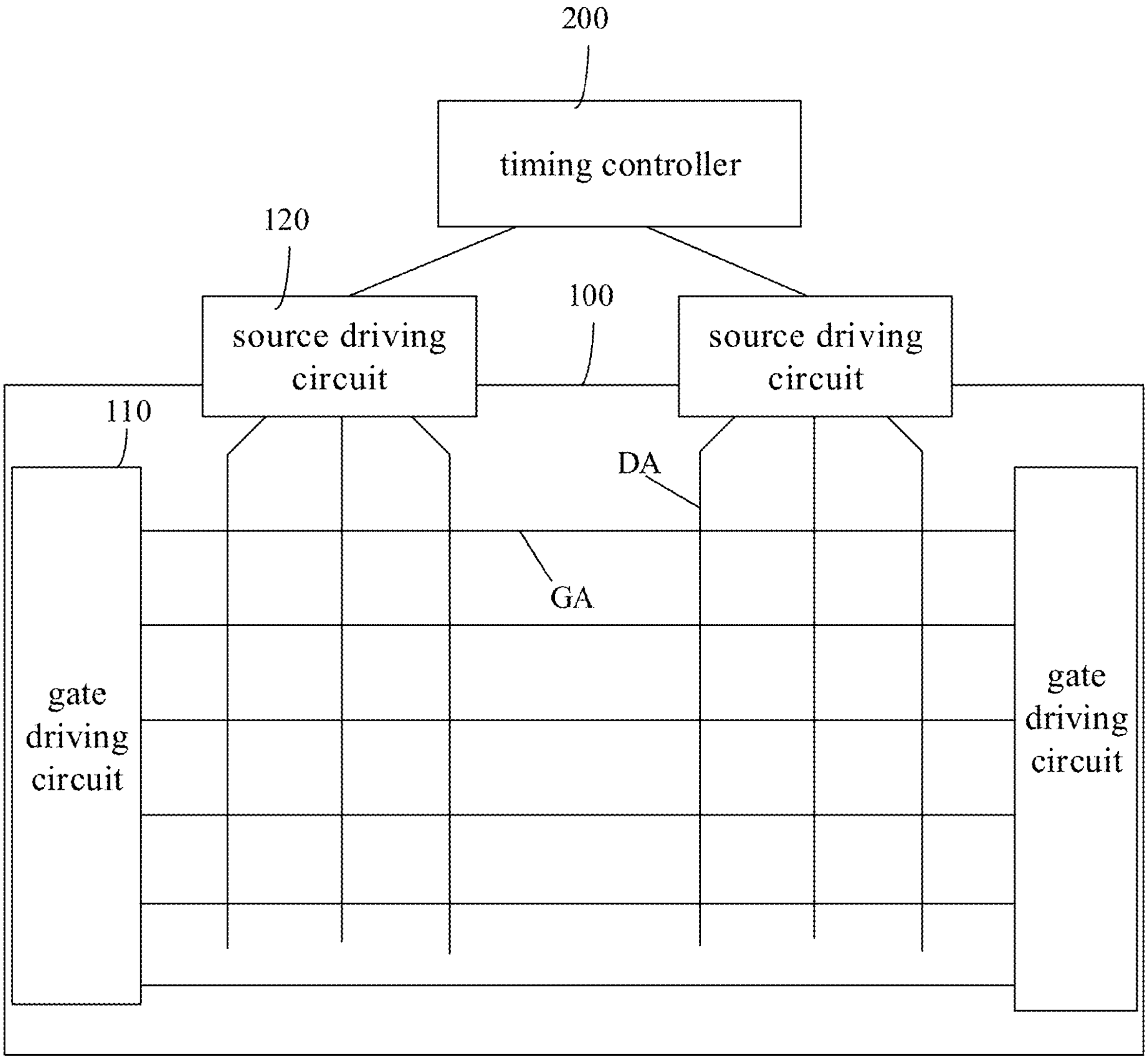
FIG. 1 is a schematic structural diagram of a display device according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. The embodiments and features of the embodiments in the present disclosure may be combined with each other without conflict. All other embodiments, which can be derived by a person skilled in the art from the described embodiments of the disclosure without creative effort, are within the protective scope of the present disclosure.

Unless defined otherwise, technical or scientific terms used herein shall have the ordinary meaning as understood by one of ordinary skill in the art to which the present disclosure belongs. The terms “first”, “second”, and the like in the present disclosure are not intended to indicate any order, quantity, or importance, but rather are used to distinguish one element from another. The term “comprising/including”, “comprises/includes”, or the like means that the element or item preceding the term includes the element or item listed after the term and its equivalent, but does not exclude other elements or items. The term “connected/connecting”, “coupled/coupling” or the like is not restricted to physical or mechanical connection, but may include electrical connection, whether direct or indirect.

It should be noted that sizes and shapes of the various elements in the drawings are not to scale, but are merely intended to schematically illustrate the present disclosure. Like reference numerals refer to like or similar elements or elements having like or similar functions throughout.

Figure 2A:
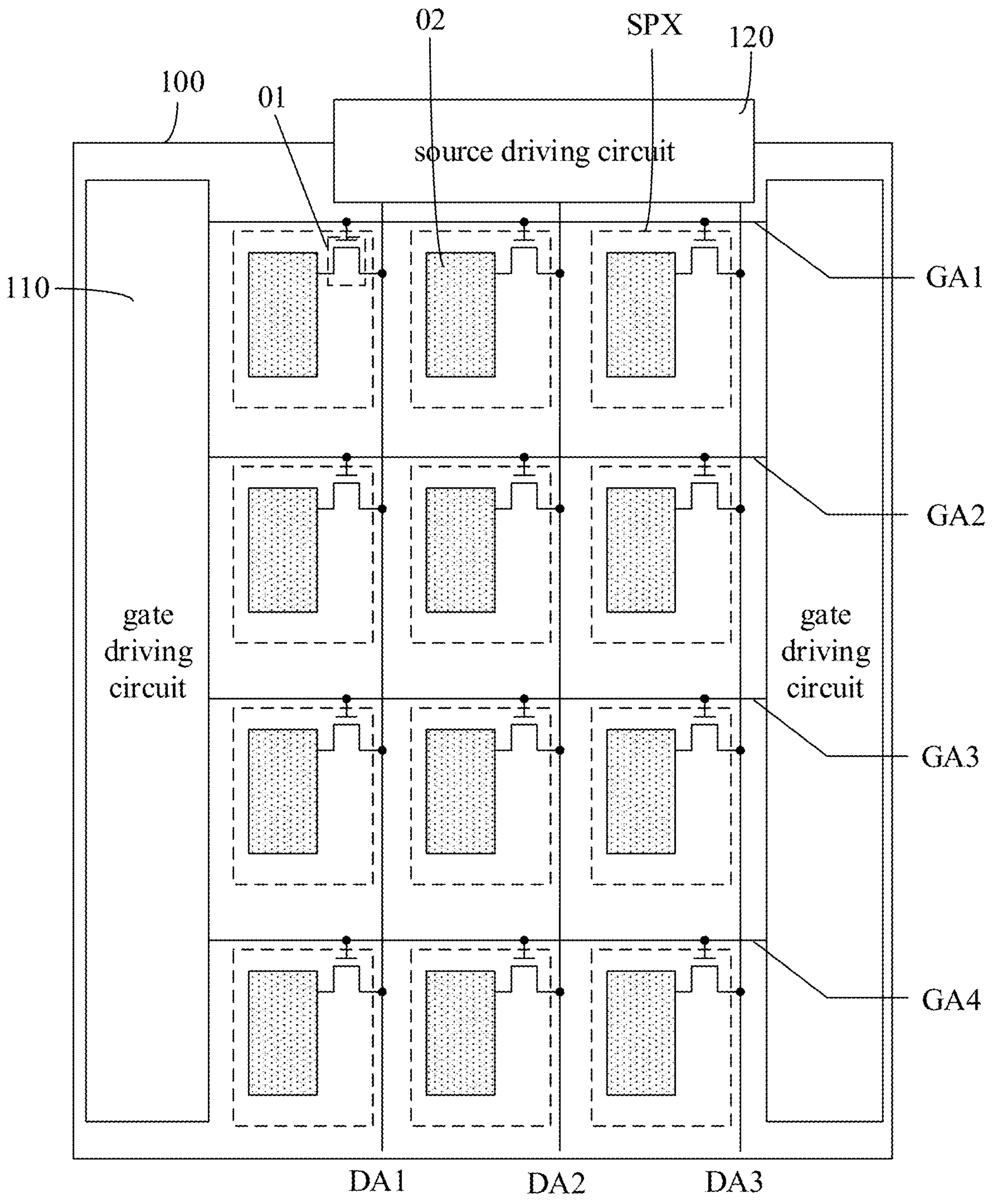
FIG. 2*a* is a schematic structural diagram of a display panel according to an embodiment of the present disclosure.

Referring to FIGS. 1 and 2*a*, a display device may include a display panel 100 and a timing controller 200. The display panel 100 may include a plurality of pixel units arranged in an array, a plurality of gate lines GA (e.g., GA1, GA2, GA3, GA 4), a plurality of data lines DA (e.g., DA1, DA2, DA3), a gate driving circuit 110, and a source driving circuit 120. The gate driving circuit 110 is coupled to the gate lines GA1, GA2, GA3, and GA4, respectively, and the source driving circuit 120 is coupled to the data lines DA1, DA2, and DA3, respectively. The timing controller 200 may input a control signal to the gate driving circuit 110 through a level shift (level conversion) circuit so as to drive the gate lines GA1, GA2, GA3, GA4. The timing controller 200 inputs a signal to the source driving circuit 120 to cause the source driving circuit 120 to input a data voltage to the data line, so as to charge a sub-pixel SPX, so that the sub-pixel SPX is input a corresponding data voltage thereinto to implement an image display function. Illustratively, two source driving circuits 120 may be provided, each of the source driving circuits 120 is connected with half of the number of data lines, and the other of the source driving circuits 120 is connected to the other half of the number of data lines. Certainly, the number of the source driving circuits 120 may alternatively be three, four, or more, which may be determined according to the requirements of practical applications, and is not limited herein.

Illustratively, referring to FIG. 2*a*, each sub-pixel SPX includes a transistor 01 and a pixel electrode 02 therein. Each row of sub-pixels SPX correspond to one gate line, and each column of sub-pixels SPX correspond to one data line. A gate of the transistor 01 is electrically connected to a gate line corresponding thereto, a source of the transistor 01 is electrically connected to a data line corresponding thereto, and a drain of the transistor 01 is electrically connected to the pixel electrode 02. It should be noted that the pixel array structure disclosed in the present disclosure may alternatively be a double-gate structure, that is, two gate lines are provided between adjacent rows of sub-pixels, with such an arrangement, the number of data lines may be reduced by half. That is to say, some adjacent columns of sub-pixels each are provide with two data lines therebetween, while the other adjacent columns of sub-pixels each are not provided with the data line therebetween. The specific arrangements of the sub-pixels, the data lines and the gate lines are not limited.

Figure 2B:
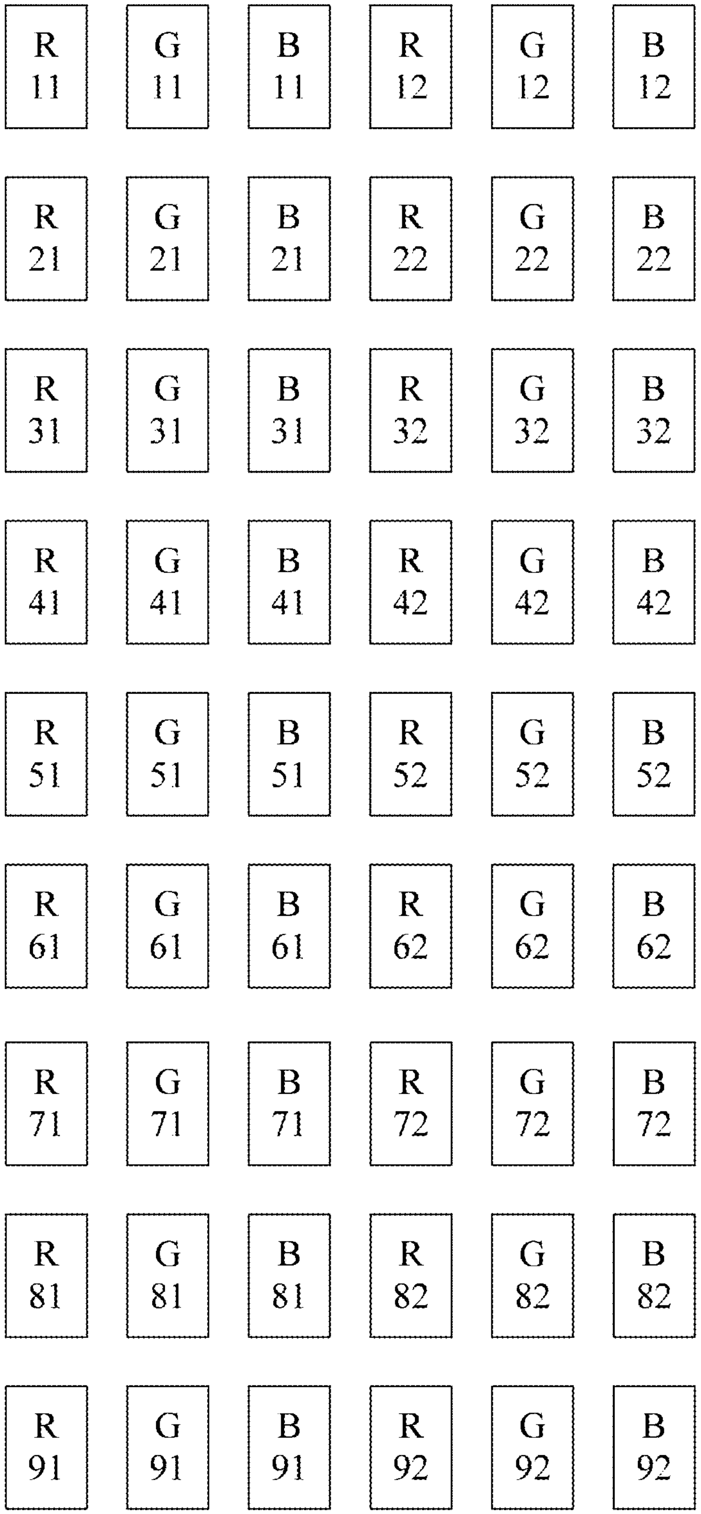
FIG. 2*b* is a schematic diagram illustrating an arrangement of some sub-pixels in a display panel according to an embodiment of the present disclosure.

Illustratively, referring to FIG. 2*b*, each pixel unit includes a plurality of sub-pixels SPX. For example, the pixel unit may include a red sub-pixel, a green sub-pixel, and a blue sub-pixel, so that red, green, and blue may be mixed to realize a color display. For example, the red sub-pixel R11, the green sub-pixel G11, and the blue sub-pixel B11 may form one pixel unit, the red sub-pixel R12, the green sub-pixel G12, and the blue sub-pixel B12 may form one pixel unit, and so on, which is not described herein again.

Alternatively, the pixel unit may include a red sub-pixel, a green sub-pixel, a blue sub-pixel, and a white sub-pixel, so that a color display may be implemented by mixing red, green, blue, and white. Certainly, in practical applications, the color of light emitted by the sub-pixels in the pixel unit may be determined according to practical application environments, and is not limited herein.

It should be noted that the display panel in the embodiment of the present disclosure may be a liquid crystal display panel. In order to prevent polarization of the liquid crystal molecules, the liquid crystal display panel often adopts a driving method of polarity inversion. That is, it is necessary to switch between positive and negative polarities of a voltage of the data signal input to the sub-pixel. The driving method of polarity inversion include frame inversion, row inversion, column inversion, and dot inversion. For example, for one of two adjacent frames of images, the polarity of the voltage of the data signal input to the pixel electrode is positive (i.e., positive frame driving is performed), and for the other of the two adjacent frames of images, the polarity of the voltage of the data signal input to the same pixel electrode is negative (i.e., negative frame driving is performed); alternatively, for two adjacent rows of sub-pixels, the polarity of the voltage of the data signal input to the pixel electrode of one of the two rows of sub-pixels is positive, and the polarity of the voltage of the data signal input to the pixel electrode of the other of the two rows of sub-pixels is negative.

Grayscales are generally obtained by dividing brightness variation between the darkest and the brightest into several parts to facilitate the brightness control of a screen. For example, the displayed image is composed of three colors of red, green and blue, each of which may exhibit various brightness levels, and red, green and blue of various brightness levels may be combined to form various colors. For example, the number of bits of the grayscale of the liquid crystal display panel is 6 bit, and the three colors of red, green and blue each have 64 (i.e., $2^6$) grayscales, and values of the 64 grayscales are 0 to 63, respectively. The number of bits of the grayscale of the liquid crystal display panel is 8 bit, and then the three colors of red, green and blue each have 256 (i.e., 28) grayscales, and values of the 256 grayscales are 0 to 255, respectively. The number of bits of the grayscale of the liquid crystal display panel is 10 bit, and then the three colors of red, green and blue each have 1024 (i.e., $2^0$) grayscales, and values of the 1024 grayscales are 0 to 1023, respectively. The number of bits of the grayscale of the liquid crystal display panel is 12 bit, and the three colors of red, green and blue each have 4096 (i.e., $2^{12}$) grayscales, and values of the 4096 grayscales are 0 to 4093, respectively.

For example, taking a sub-pixel SPX as an example, in a case where the data voltage Vda1 input to the pixel electrode of the sub-pixel SPX is greater than a common electrode voltage Vcom, the liquid crystal molecules at the sub-pixel SPX may have a positive polarity, and the polarity corresponding to the data voltage Vda1 of the sub-pixel SPX is positive. In a case where the data voltage Vda2 input to the pixel electrode of the sub-pixel SPX is less than the common electrode voltage Vcom, the liquid crystal molecules at the sub-pixel SPX may have a negative polarity, and the polarity corresponding to the data voltage Vda2 at the sub-pixel SPX is negative. For example, the common electrode voltage may be 8.3V, and if the data voltage of 8.8V to 16V is input to the pixel electrode of the sub-pixel SPX, then the liquid crystal molecules at the sub-pixel SPX may have the positive polarity, and the data voltage of 8.8V to 16V is a data voltage corresponding to the positive polarity. If a data voltage of 0.6V to 7.8V is input to the pixel electrode of the sub-pixel SPX, then the liquid crystal molecules at the sub-pixel SPX may have the negative polarity, and the data voltage of 0.6V to 7.8V is a data voltage corresponding to the negative polarity. For example, taking a case of grayscale values of 0 to 255 of 8 bits as an example, if a data voltage of 16V is input to the pixel electrode of the sub-pixel SPX, the sub-pixel SPX can realize the brightness corresponding to a maximum grayscale value (i.e., the grayscale value of 255) by using a data voltage having the positive polarity. If a data voltage of 0.6V is input to the pixel electrode of the sub-pixel SPX, the sub-pixel SPX can realize the brightness of a maximum grayscale value (i.e., the grayscale value of 255) by using a data voltage having the negative polarity. It should be noted that there may be a voltage difference between the data voltage with the grayscale value of 0 and the common electrode voltage, for example, the common electrode voltage is 8.3V, the data voltage with the positive polarity corresponding to the grayscale value of 0 may be 8.8V, and the data voltage with the negative polarity corresponding to the grayscale value of 0 may be 7.8V. Certainly, the data voltage with the grayscale value of 0 and the common electrode voltage may be the same, which may be determined as desired in practical applications and is not limited herein.

Figure 3:
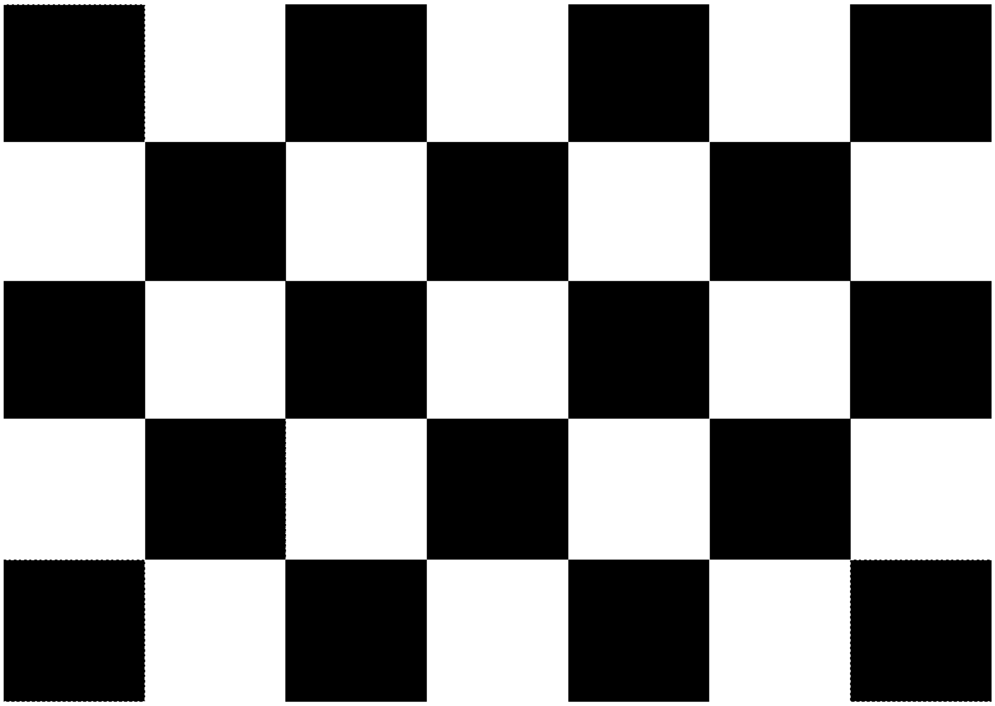
FIG. 3 is a schematic diagram illustrating a part of a checkerboard image according to an embodiment of the present disclosure.
Figure 4A:
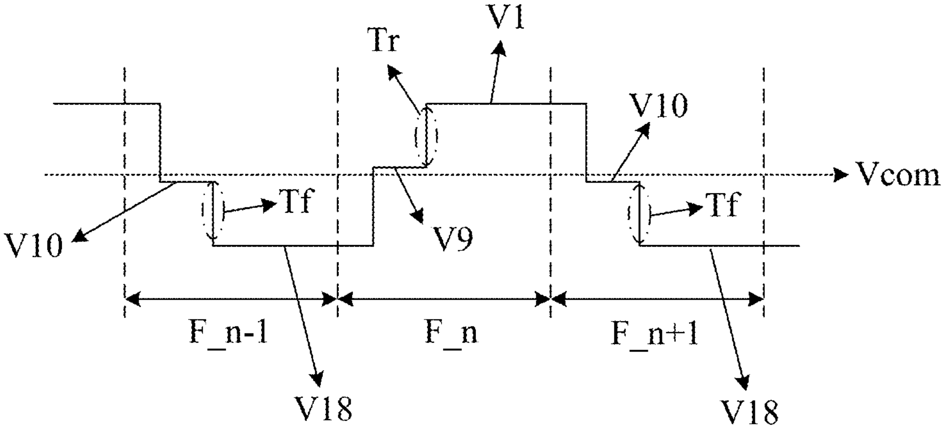
FIG. 4*a* is a schematic diagram illustrating variations in a data voltage according to an embodiment of the present disclosure.
Figure 4B:
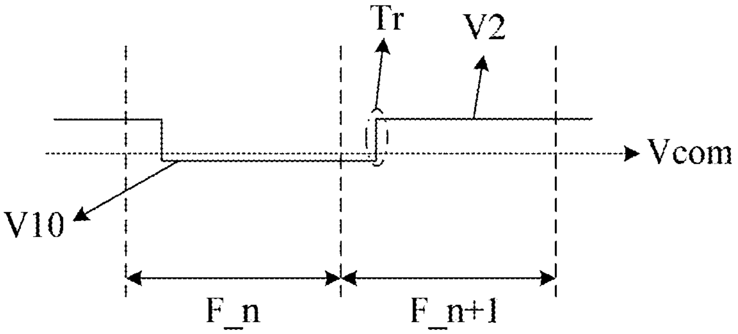
FIG. 4*b* is a schematic diagram illustrating variations in a data voltage according to an embodiment of the present disclosure.
Figure 4C:
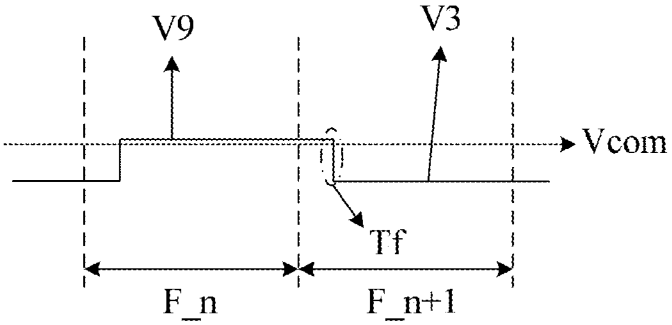
FIG. 4*c* is a schematic diagram illustrating variations in a data voltage according to an embodiment of the present disclosure.
Figure 4D:
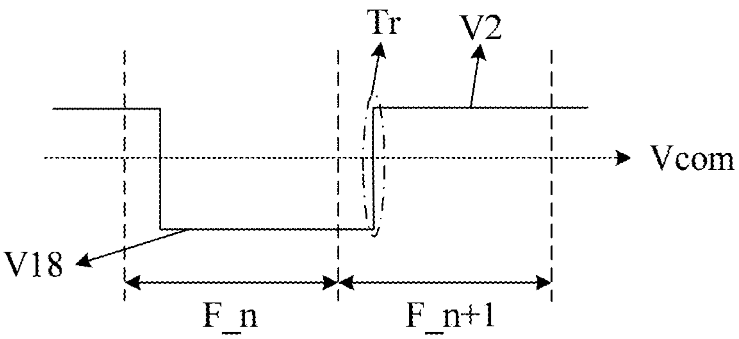
FIG. 4*d* is a schematic diagram illustrating variations in a data voltage according to an embodiment of the present disclosure.
Figure 4E:
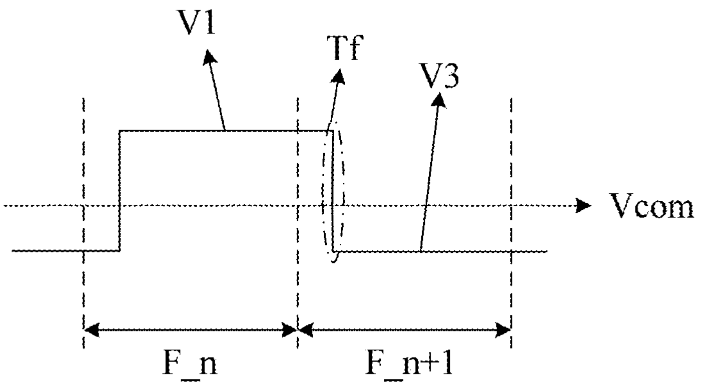
FIG. 4*e* is a schematic diagram illustrating variations in a data voltage according to an embodiment of the present disclosure.
Figure 5:
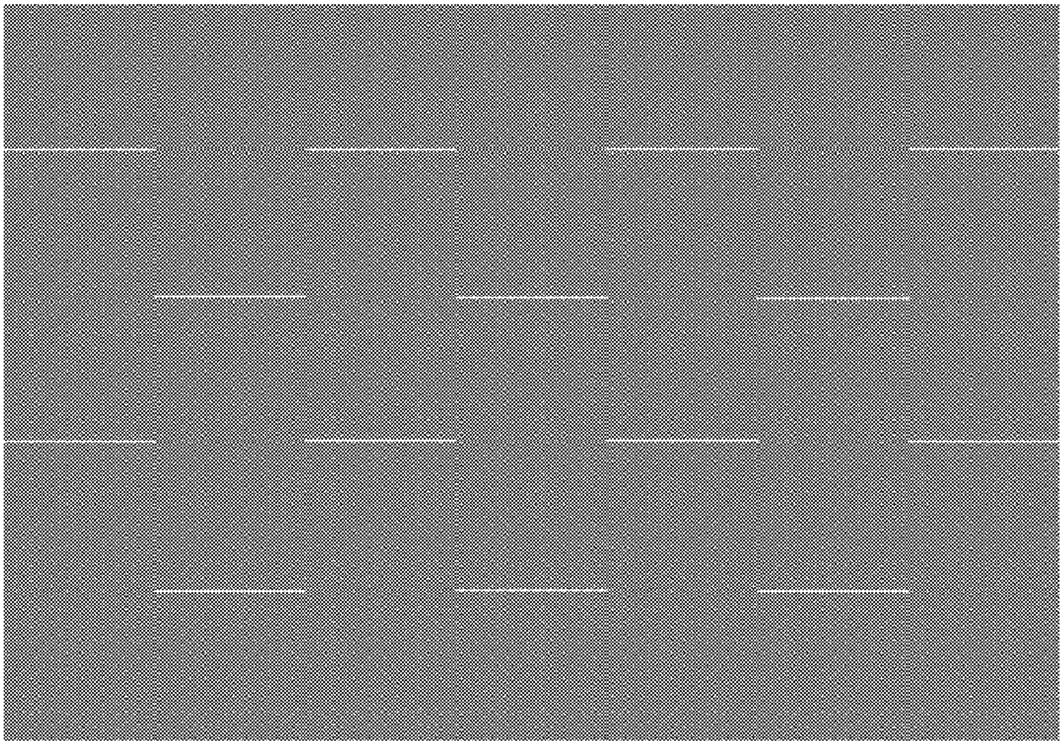
FIG. 5 is a schematic diagram illustrating a grayscale image according to an embodiment of the present disclosure.

Referring to FIGS. 3 to 5, taking a black-and-white checkerboard image shown in FIG. 3 and the grayscale values of 0 to 255 of 8 bits as an example, a black grid has a grayscale value of 0, and the data voltage with the positive polarity (i.e., positive data voltage) corresponding to the black grid is V9, and the data voltage with the negative polarity (i.e., negative data voltage) corresponding to the black grid is V10. A white grid has a grayscale value of 255, and the positive data voltage corresponding to the white grid is V1, and the negative data voltage corresponding to the white grid is V18. The entire display area of the display panel may be divided into 7×5 squares, and when the display panel displays the black-and-white checkerboard image for 10 minutes or more and then switches to a grayscale image with a grayscale value of 127 as shown in FIG. 5, a bright-line afterimage is visible in the first row of the white grid at a boundary between the black grid and the white grid.

The reason for the above-described failure is in that: taking the column inversion driving mode as an example and taking a sub-pixel in the white grid as an example, as shown in FIG. 4*a*, in two adjacent display frames, the data voltage of the sub-pixel may vary between the positive data voltage V9 and the negative data voltage V10. Taking a sub-pixel in the black grid as an example, in two adjacent display frames, the data voltage of the sub-pixel may vary between the posite data voltage V1 and the negative data voltage V18. When the black-and-white checkerboard image is switched to an image with a low grayscale (e.g., an image with a grayscale value of 127), taking two sub-pixels in a same row in the black grid as an example, as shown in FIG. 4*b*, in an $n^{th}$ display frame F_n, one of the two sub-pixels in the same row in the black grid is input with the negative data voltage V10 to display the image of the black grid. In an $(n+1)^{th}$ display frame F_n+1, the sub-pixel is input with the positive data voltage V2 to display an image with a grayscale value of 127, and the data voltage is subjected to a charging process from V10 to V2 (i.e., V10-V2). As shown in FIG. 4*c*, in the $n^{th}$ display frame F_n, the other of the two sub-pixels in the same row in the black grid is input with the positive data voltage V9 to display an image of the black grid. In the $(n+1)^{th}$ display frame F_n+1, the sub-pixel is input with a negative data voltage V3 to display an image with the grayscale value of 127, and the data voltage is subjected to a discharging process from V9 to V3 (i.e., V9-V3).

Taking a sub-pixel in a white grid as an example, as shown in FIG. 4*d*, in the $n^{th}$ display frame F_n, the sub-pixel is input with a negative data voltage V18 to display an image of the white grid. In the $(n+1)^{th}$ display frame F_n+1, the sub-pixel is input with a positive data voltage V2 to display an image with a grayscale value of 127, and the data voltage is subjected to a charging process from V18 to V2 (i.e., V18-V2). Taking another sub-pixel in the white grid as an example, as shown in FIG. 4*e*, in the $n^{th}$ display frame F_n, the sub-pixel is input with a positive data voltage V1 to display an image of the white grid. In the $(n+1)^{th}$ display frame F_n+1, the sub-pixel is input with a negative data voltage V3 to display an image with a grayscale value of 127, and the data voltage is subjected to a charging process from V1 to V3 (i.e., V1-V3).

Figure 6:
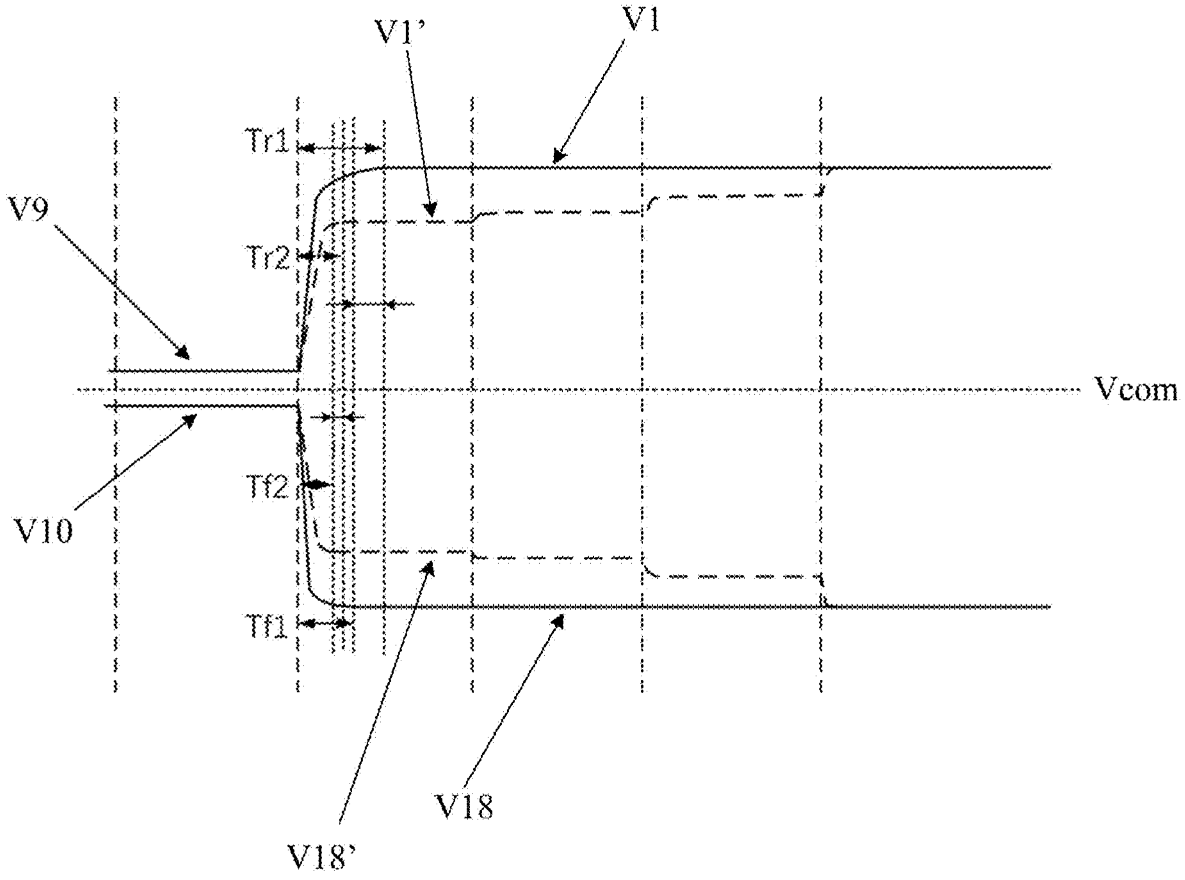
FIG. 6 is a schematic diagram illustrating variations in a data voltage according to an embodiment of the present disclosure.

As shown in FIG. 6, a charging time of the charging process of the data voltage is Tr1, and a discharging time of the discharging process of the data voltage is Tf1. It can be seen from FIG. 6 that the charging time Tr1 is greater than the discharging time Tf1, which results in a greater difference between the charging time Tr1 and the discharging time Tf1. Especially under a condition of insufficient charging of a large-size panel, a difference in charge accumulation occurs between the liquid crystal molecules corresponding to the sub-pixels with positive and negative polarities due to the difference between the charging time Tr1 and the discharging time Tf1, the difference in charging rate between the sub-pixels with positive and negative polarities forms a direct current bias voltage, the transmittance of the liquid crystal molecules at the sub-pixels is larger than that of the liquid crystal molecules at other sub-pixels due to the bias voltage, so that the bright-line afterimage is formed. In particular, when the black-and-white checkerboard image is switched to the image with a lower grayscale value (for example, the image with a grayscale value of 127), a bright-line afterimage is visible in the first row of the white grid at the boundary between the black grid and the white grid. An embodiment of the present disclosure provides a method for driving a display panel, which, by acquiring an original grayscale value of each sub-pixel in the $m^{th}$ row and a target grayscale value corresponding to a data voltage charged into each sub-pixel in the $(m-1)^{th}$ row, can determine a target grayscale value of each sub-pixel in an $m^{th}$ row according to an original grayscale value of the sub-pixel in the $m^{th}$ row and a target grayscale value of a sub-pixel in an $(m-1)^{th}$ row in the same column as the sub-pixel in the $m^{th}$ row. Therefore, data voltages may be input to data lines in the display panel according to the target grayscale value of each sub-pixel in the $m^{th}$ row, so that each sub-pixel in the $m^{th}$ row is charged with a corresponding data voltage, and the problem of line afterimage is solved.

Figure 7:
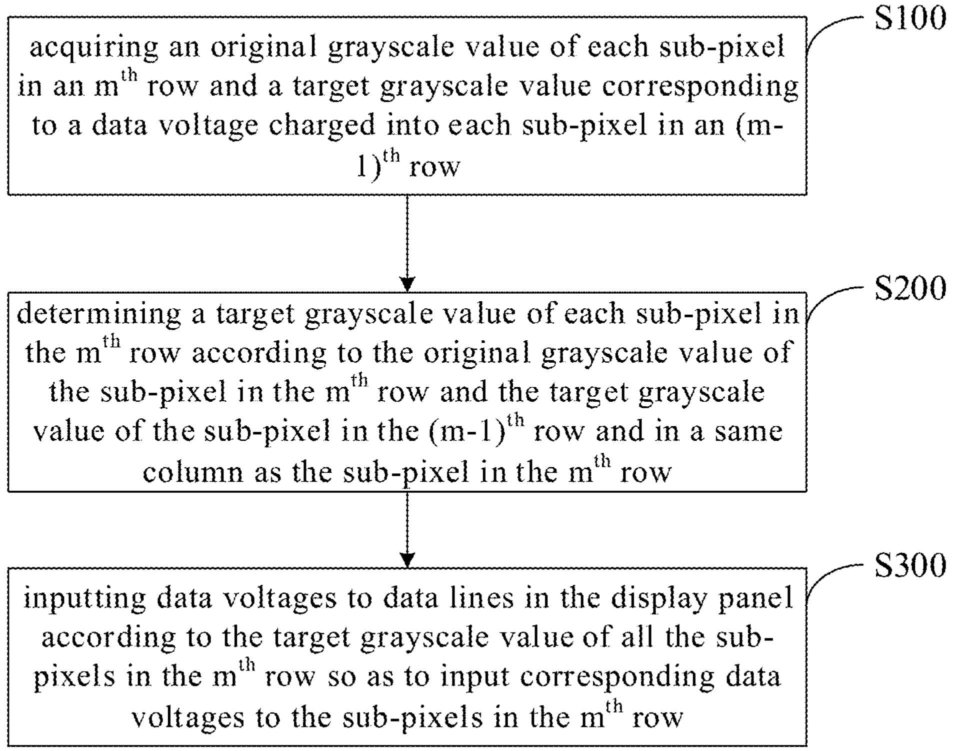
FIG. 7 is flowchart of a method for driving a display panel according to an embodiment of the present disclosure.

As shown in FIG. 7, the method for driving the display panel according to the embodiment of the present disclosure may include steps S100 to S300.

At step S100, acquiring an original grayscale value of each sub-pixel in an $m^{th}$ row and a target grayscale value corresponding to the data voltage charged into each sub-pixel in the $(m-1)^{th}$ row.

Illustratively, the display panel displays in a column inversion driving manner. For example, the data voltage corresponding to one column of sub-pixels has a negative polarity, the data voltage corresponding to another column of sub-pixels has a positive polarity, and the columns of sub-pixels with a positive polarity and the columns of sub-pixels with a negative polarity are alternately arranged.

For example, the acquiring the original grayscale value of each sub-pixel in the $m^{th}$ row may include: receiving an original display data of each sub-pixel in the $m^{th}$ row, where the original display data includes a digital voltage of a data voltage carrying a corresponding grayscale value, and the grayscale value corresponding to the data voltage is the original grayscale value. Thus, the original grayscale value of each sub-pixel in the $m^{th}$ row may be determined according to an original display data of each sub-pixel in the $m^{th}$ row.

Illustratively, for a sub-pixel in the $(m-1)^{th}$ row, the target grayscale value corresponding to the data voltage charged into the sub-pixel is different from the original grayscale value corresponding to the sub-pixel. After the target grayscale value corresponding to the data voltage charged into each sub-pixel in the $(m-1)^{th}$ row is determined, the target grayscale value may be stored at the same time so as to be obtained when the target grayscale value corresponding to the data voltage charged into each sub-pixel in the $m^{th}$ row is determined.

Illustratively, m is an integer greater than 1. For example, m may be a numerical value such as 2, 3, 4 and 5, which may be determined as desired, and is not limited herein.

Illustratively, as shown in FIG. 2*b*, for the red sub-pixels R11 and R21 in the first column, a target grayscale value Lmr11 corresponding to the red sub-pixel R11 and an original grayscale value Lyr21 corresponding to the red sub-pixel R21 may be obtained. For the green sub-pixels G11 and G21 in the second column, a target grayscale value Lmg11 corresponding to the green sub-pixel G11 and an original grayscale value Lyg21 corresponding to the green sub-pixel G21 may be obtained. For the blue sub-pixels B11 and B21 in the third column, a target grayscale value Lmb11 corresponding to the blue sub-pixel B111 and an original grayscale value Lyg21 corresponding to the blue sub-pixel B21 may be obtained. The rest may be analogized in turn, and the details are not described herein.

At step S200, in a case where the original grayscale value of the sub-pixel in the $m^{th}$ row is larger than the target grayscale value of the sub-pixel of the $(m-1)^{th}$ row and in the same column as the sub-pixel in the $m^{th}$ row, determining the target grayscale value of the sub-pixel in the $m^{th}$ row according to the original grayscale value of the sub-pixel in the $m^{th}$ row and the target grayscale value of the sub-pixel in the $(m-1)^{th}$ row and in the same column as the sub-pixel in the $m^{th}$ row.

Illustratively, the step S200 of determining the target grayscale value of each sub-pixel in the $m^{th}$ row according to the original grayscale value of the sub-pixel in the $m^{th}$ row and the target grayscale value of the sub-pixel in the $(m-1)^{th}$ row and in the same column as the sub-pixel in the $m^{th}$ row may include: for an $n^{th}$ column (n is an integer greater than 0, for example, n may be a numerical value such as 1, 2, 3, 4, which is not limited herein), determining a grayscale difference between the original grayscale value corresponding to the sub-pixel in the $m^{th}$ row and the target grayscale value corresponding to the sub-pixel in the $(m-1)^{th}$ row; in a case where an absolute value of the grayscale difference corresponding to the $n^{th}$ column is larger than a preset threshold, reducing the original grayscale value of the sub-pixel in the $m^{th}$ row in the $n^{th}$ column according to the original grayscale value of the sub-pixel in the $m^{th}$ row in the $n^{th}$ column, the target grayscale value of the sub-pixel in the $(m-1)^{th}$ row and in the $n^{th}$ column and a target lookup grayscale value in a pre-stored target lookup table, and determining the reduced original grayscale value of the sub-pixel in the $m^{th}$ row in the $n^{th}$ column as the target grayscale value of the sub-pixel in the $m^{th}$ row and in the $n^{th}$ column; in a case where the absolute value of the grayscale difference corresponding to the $n^{th}$ column is not larger than the preset threshold, determining the original grayscale value of the sub-pixel in the $m^{th}$ row in the $n^{th}$ column as the target grayscale value corresponding to the sub-pixel in the $m^{th}$ row in the $n^{th}$ column. For example, the preset threshold may be greater than 1 and less than or equal to the maximum grayscale value. For example, in a case where the number of bits of the grayscale is 8, the preset threshold may be greater than 1 and less than or equal to 255. In a case where the number of bits of the grayscale is 10, the preset threshold may be greater than 1 and less than or equal to 1023. In a case where the number of bits of grayscale is 12, the preset threshold may be greater than 1 and less than or equal to 4095. In practical applications, the preset threshold may be 1, 2, 3, 5, 8, 10, or the maximum grayscale value, which is not limited herein.

In some implementations of the present disclosure, a target lookup table may be stored in an image quality function processing module 210 of the timing controller. The target lookup table may include: a plurality of first grayscale values different from each other, a plurality of second grayscale values different from each other and a target lookup grayscale value corresponding to any one of the first grayscale values and any one of the second grayscale values. Illustratively, the target lookup table has a corresponding number of bits of grayscale, i.e., the first grayscale value, the second grayscale value and the target lookup grayscale value in the target lookup table have a corresponding number of bits of grayscale.

For example, the number of bits of grayscale corresponding to the target lookup table is 10, and the numbers of bits of grayscale corresponding to the first grayscale value, the second grayscale value and the target lookup grayscale value all may be 10 bits, for example, the first grayscale value in the target lookup table may include all grayscale values of 0 to 1023 represented by 10 bits, and the second grayscale value may include all grayscale values of 0 to 1023 presented by 10 bits. Alternatively, the first grayscale value in the target lookup table may include a part of grayscale values of 0 to 1023 presented by 10 bits, and the second grayscale value may include a part of grayscale values of 0 to 1023 presented by 10 bits. It should be noted that the first grayscale value may correspond to the target grayscale value of each sub-pixel in the $(m-1)^{th}$ row, and the second grayscale value may correspond to the original grayscale value of each sub-pixel in the $m^{th}$ row.

Illustratively, taking the red sub-pixels R11 and R21 in the first column as an example, with reference to FIG. 2*b*, a grayscale difference Lyr21−Lmr11 between the target grayscale value Lmr11 corresponding to the red sub-pixel R11 and the original grayscale value Lyr21 corresponding to the red sub-pixel R21 may be determined. In a case where the grayscale difference Lyr21−Lmr11 is greater than a preset threshold, it indicates that the afterimage is more likely to occur, therefore, the original grayscale value Lyr21 of the red sub-pixel R21 may be reduced according to the target grayscale value Lmr11 corresponding to the red sub-pixel R11, the original grayscale value Lyr21 corresponding to the red sub-pixel R21, and the target lookup grayscale value corresponding to the target grayscale value Lmr11 and the original grayscale value Lyr21 in the pre-stored target lookup table and then determined as the target grayscale value corresponding to the red sub-pixel R21. In a case where the grayscale difference Lyr21−Lmr11 is not greater than the preset threshold, it indicates that the afterimage is less likely to occur, therefore, the original grayscale value Lyr21 of the red sub-pixel R21 may be determined as the target grayscale value corresponding to the red sub-pixel R21.

Taking the green sub-pixels G11 and G21 in the second column as an example, with reference to FIG. 2*b*, a grayscale difference Lyg21−Lmg11 between the target grayscale value Lmg11 corresponding to the green sub-pixel G11 and the original grayscale value Lyg21 corresponding to the green sub-pixel G21 may be determined. In a case where the grayscale difference Lyg21−Lmg11 is greater than a preset threshold, it indicates that the afterimage is more likely to occur, therefore, the original grayscale value Lyg21 of the green sub-pixel G21 may be reduced according to the target grayscale value Lmg11 corresponding to the green sub-pixel G11, the original grayscale value Lyg21 corresponding to the green sub-pixel G21, and the target lookup grayscale value corresponding to the target grayscale value Lmg11 and the original grayscale value Lyg21 in the pre-stored target lookup table and then determined as the target grayscale value corresponding to the green sub-pixel G21. In a case where the grayscale difference Lyg21−Lmg11 is not greater than the preset threshold, it indicates that the afterimage is less likely to occur, therefore, the original grayscale value Lyg21 corresponding to the green sub-pixel G21 may be determined as the target grayscale value corresponding to the green sub-pixel G21.

Taking the blue sub-pixels B11 and B21 in the third column as an example, with reference to FIG. 2*b*, a grayscale difference Lyb21−Lmb11 between the target grayscale value Lmb11 corresponding to the blue sub-pixel B11 and the original grayscale value Lyb21 corresponding to the blue sub-pixel B21 may be determined. In a case where the grayscale difference Lyb21−Lmb11 is greater than a preset threshold, it indicates that the afterimage is likely to occur, the original grayscale value Lyb21 of the blue sub-pixel B21 may be reduced according to the target grayscale value Lmb11 corresponding to the blue sub-pixel B11, the original grayscale value Lyb21 corresponding to the blue sub-pixel B21, and the target lookup grayscale value corresponding to the target grayscale value Lmb11 and the original grayscale value Lyb21 in the pre-stored target lookup table and then determined as the target grayscale value corresponding to the blue sub-pixel B21. In a case where the grayscale difference Lyb21−Lmb11 is not greater than the preset threshold, it indicates that the afterimage is less likely to occur, therefore, the original grayscale value Lyb21 corresponding to the blue sub-pixel B21 may be determined as the target grayscale value corresponding to the blue sub-pixel B21.

The same is true for the rest of the sub-pixels, which is not described herein.

Figure 8:
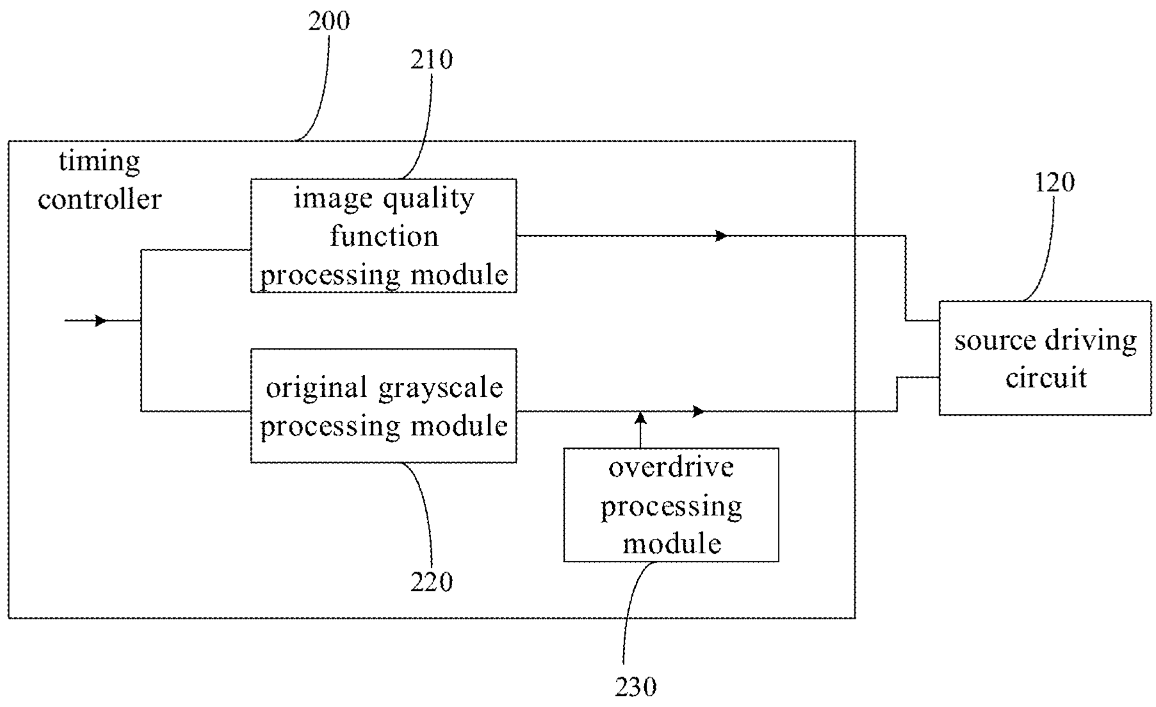
FIG. 8 is a block diagram of a timing controller according to an embodiment of the present disclosure.

In some implementations, with reference to FIG. 8, the determining the original grayscale value of the sub-pixel in the $m^{th}$ row and in the $n^{th}$ column, after being reduced according to the original grayscale value of the sub-pixel in the $m^{th}$ row and in the $n^{th}$ column, the target grayscale value of the sub-pixel in the $(m-1)^{th}$ row and in the $n^{th}$ column, and the target lookup grayscale value in the pre-stored target lookup table, as the target grayscale value of the sub-pixel in the $m^{th}$ row and in the $n^{th}$ column may include the following procedures.

Firstly, the target lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column is determined in the target lookup table. For example, the number of bits of grayscale corresponding to the display panel and the number of bits of grayscale corresponding to the target lookup table may be different. For example, the number of bits of grayscale corresponding to the display panel is 8 bits, the number of bits of grayscale of the pre-stored target lookup table is 10 bits, the grayscale value of 0 of 8 bits may be first converted into the grayscale value of 0 of 10 bits, the grayscale value of 255 of 8 bits may be converted into the grayscale value of 1023 of 10 bits, and the grayscale values of 1 to 254 of 8 bits may be converted into the grayscale values of 19 bits by multiplying 4 thereby. That is, the minimum grayscale value in the number of bits of grayscale of the display panel corresponds to the minimum grayscale value in the number of bits of grayscale of the target lookup table, the maximum grayscale value in the number of bits of grayscale of the display panel corresponds to the maximum grayscale value in the number of bits of grayscale of the target lookup table, and the rest grayscale values in the number of bits of grayscale of the display panel may be converted into the grayscale values in the number of bits of grayscale of the target lookup table after being multiplied by $2^k$. Then, with reference to FIG. 10, the corresponding target lookup grayscale value is found in the target lookup table.

As shown in FIG. 10, FIG. 10 illustrates a part of the first grayscale values of 10 bits and a part of the second grayscale values of 10 bits, and target difference grayscale values corresponding to the first grayscale values and the second grayscale values. The values in the first row in FIG. 10 represent the first grayscale values, the values in the first column represent the second grayscale values, and the rest values represent the target difference grayscale values. It should be noted that the specific values of the grayscale values illustrated in FIG. 10 are merely exemplary, which may be, in practical applications, determined as desired, and is not limited herein. It should be noted that the first grayscale value may correspond to the target grayscale value of each sub-pixel in the $(m-1)^{th}$ row, and the second grayscale value may correspond to the original grayscale value of each sub-pixel in the $m^{th}$ row.

For example, in a case where the number of bits of grayscale corresponding to the display panel and the number of bits of grayscale corresponding to the target lookup table are both 10 bits, with reference to FIG. 10, the corresponding target lookup grayscale value may be directly found in the target lookup table. Alternatively, in a case where the number of bits of grayscale corresponding to the display panel is different from the number of bits of grayscale corresponding to the target lookup table, the original grayscale value of the sub-pixel in the $m^{th}$ row and in the $n^{th}$ column and the target grayscale value of the sub-pixel in the $(m-1)^{th}$ row and in the $n^{th}$ column may be converted into the grayscale value corresponding to the number of bits of grayscale corresponding to the target lookup table, and then the corresponding target lookup grayscale value may be found in the target lookup table. For example, in a case where the number of bits of grayscale corresponding to the display panel is 8 bits and the number of bits of grayscale corresponding to the target lookup table is 10 bits, the grayscale value of 0 of 8 bits may be first converted into the grayscale value of 0 of 10 bits, the grayscale value of 255 of 8 bits may be converted into the grayscale value of 1023 of 10 bits, and the grayscale values of 1 to 254 of 8 bits may be converted into the grayscale value in 10 bit by multiplying 4 thereby. Then, with reference to FIG. 10, the corresponding target lookup grayscale value is found in the target lookup table.

For example, referring to FIGS. 2*a* and 10, in a case where the number of bits of grayscale corresponding to the display panel is 8 bits and the number of bits of grayscale corresponding to the target lookup table is 10 bits, taking the red sub-pixels R11 and R21 in the first column as an example, if the target grayscale value Lmr11 corresponding to the red sub-pixel R11 is the grayscale value of 0 of 8 bits and is converted into the grayscale value of 0 of 10 bits, and the original grayscale value corresponding to the red sub-pixel R21 is the grayscale value of 255 of 8 bits and is converted into the grayscale value of 1023 of 10 bits, it can be found from FIG. 10 that the grayscale value of 0 and the grayscale value of 1023 correspond to 450, and then the target lookup grayscale value is 450. Taking the green sub-pixels G11 and G21 in the second column as an example, if the target grayscale value Lmg11 corresponding to the green sub-pixel G11 is the grayscale value of 0 of 8 bits and is converted to the grayscale value of 0 of 10 bits, and the original grayscale value Lyg21 corresponding to the green sub-pixel G21 is the grayscale value of 255 of 8 bits and is converted to the grayscale value of 1023 of 10 bits, it can be found from FIG. 10 that the grayscale value of 0 and the grayscale value of 1023 correspond to 450, and then the target lookup grayscale value is 450. The same is true for the rest of the sub-pixels, which is not described herein again.

Secondly, a target grayscale conversion value corresponding to the sub-pixel in the $m^{th}$ row and in the $n^{th}$ column is determined according to the determined target lookup grayscale value, a first setting value and a second setting value. For example, a first grayscale conversion value corresponding to the sub-pixel in the $m^{th}$ row and in the $n^{th}$ column is determined according to the determined target lookup grayscale value, the first setting value, and the second setting value by using a formula of $Z11=(Y11-A11)/A12$, where Z11 represents the first grayscale conversion value, Y11 represents the target lookup grayscale value, A11 represents the first setting value, A12 represents the second setting value, $A12=2^k$ (k represents a difference between the number of bits of grayscale corresponding to the target lookup table and the number of bits of grayscale corresponding to the display panel), and $Y11<A11$. The first grayscale conversion value is rounded (an integer portion of the first grayscale conversion value is taken) according to a rounding rule to determine the target grayscale conversion value. For example, if the number of bits of grayscale corresponding to the target lookup table is 10 bits and the number of bits of grayscale corresponding to the display panel is 8 bits, then $A12=4$, and $Z11=(Y11-A11)/4$. Taking a case where the target lookup grayscale value of the red sub-pixel R21 in the first column is 450 and A11 may be set to be 512 as an example, the first grayscale conversion value Z11 corresponding to the red sub-pixel G21 may be calculated as follows: $Z11=(450-512)/4=-15.5$. Taking a case where the target lookup grayscale value of the green sub-pixel G21 in the first column is 450 and A11 may be set to be 512, the first grayscale conversion value Z11 corresponding to the green sub-pixel G21 may be calculated as follows: $Z11=(450-512)/4=-15.5$.

It should be noted that, in a case where Z11 is an integer, Z11 may be directly used as the target grayscale conversion value. In a case where Z11 is a decimal, Z11 may be rounded off to obtain a rounded integer as the target grayscale conversion value. For example, −15.5 may be rounded off as the target grayscale conversion value, which is −16. Alternatively, in a case where Z11 is a decimal, a numerical value following the decimal point may be directly discarded, and the integral part may be directly used as the target grayscale conversion value. For example, −15.5 may be processed according to the rule of directly using the integral part as the target grayscale conversion value, and the target grayscale conversion value is −15. In the following, taking a case where in response to that Z11 is a decimal, an integer part obtained by directly rounding off the numerical value following the decimal point is taken as the target grayscale conversion value as an example.

In some implementations of the present disclosure, the first setting value may be a prestored value, or may alternatively be a value obtained from a lookup table. For example, an overdrive lookup table may be stored in the image quality function processing module 210 of the timing controller. The overdrive look-up table may include a plurality of first grayscale values different from each other, a plurality of second grayscale values different from each other and overdrive lookup grayscale values each corresponding to any one of the first grayscale values and any one of the second grayscale values. It should be noted that the first grayscale values and the second grayscale values in the overdrive lookup table are the same as those in the target lookup table, respectively. That is, the number of bits of grayscale corresponding to the target lookup table is the same as that corresponding to the overdrive lookup table. For example, the number of bits of grayscale corresponding to the target lookup table is 10 bits, the number of bits of grayscale corresponding to the overdrive lookup table is also 10 bits, and the number of bits of grayscale corresponding to an overdrive lookup grayscale value is 10 bits. For example, the first grayscale values in the overdrive lookup table may be all of the grayscale values of 0 to 1023 of 10 bits, and the second grayscale values in the overdrive lookup table may be all of the grayscale values of 0 to 1023 of 10 bits. Alternatively, the first grayscale values in the overdrive lookup table may be a part of the grayscale values of 0 to 1023 of 10 bits, and the second grayscale values may be a part of grayscale values of 0 to 1023 of 10 bits. It should be noted that, in the overdrive lookup table, the overdrive lookup grayscale values corresponding to different first grayscales and different second grayscales may be the same or different, and are not described herein again.

Illustratively, as shown in FIG. 11, FIG. 11 illustrates a part of the first grayscale values and a part of the second grayscale values of 10 bits, and overdrive lookup grayscale values corresponding to these first grayscale values and these second grayscale values. In FIG. 11, the values in the first row represent the first grayscale values, the values in the first column represent the second grayscale values, and the rest values represent the overdrive lookup grayscale values. It should be noted that the specific values of the grayscale values illustrated in FIG. 11 are merely exemplary, which can be, in practical applications, determined as desired, and is not limited herein. It should be noted that the first grayscale values may correspond to target grayscale values of the sub-pixels in the $(m-1)^{th}$ row, and the second grayscale values may correspond to the original grayscale values of the sub-pixel in the $m^{th}$ row.

In some implementations of the present disclosure, the overdrive lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column may be determined in the prestored overdrive lookup table, and the determined overdrive lookup grayscale value is determined as the first setting value. For example, referring to FIG. 2*b*, FIG. 10 and FIG. 11, in a case where the number of bits of grayscale corresponding to the display panel is 8 bits and the number of bits of grayscale corresponding to the target lookup table is 10 bits, taking the red sub-pixels R11 and R21 in the first column as an example, if the target grayscale value Lmr11 corresponding to the red sub-pixel R11 is the grayscale value of 0 of 8 bits and is converted into the grayscale value of 0 of 10 bits, and the original grayscale value corresponding to the red sub-pixel R21 is the grayscale value of 255 of 8 bits and is converted into the grayscale value of 1023 of 10 bits, it can be found from FIG. 11 that the grayscale value of 0 and the grayscale value of 1023 correspond to 512, so that the overdrive lookup grayscale value is 512. Taking the green sub-pixels G11 and G21 in the second column as an example, if the target grayscale value Lmg11 corresponding to the green sub-pixel G11 is the grayscale value of 0 of 8 bits and is converted to the grayscale value of 0 of 10 bits, and the original grayscale value Lyg21 corresponding to the green sub-pixel G21 is the grayscale value of 255 of 8 bits and is converted to the grayscale value of 1023 of 10 bits, it can be found from FIG. 11 that the grayscale value of 0 and the grayscale value of 1023 correspond to 512, so that the overdrive lookup grayscale value is 512. The same is true for the rest sub-pixels, which is not described herein again.

Thirdly, the original grayscale value of the sub-pixel in the $m^{th}$ row and in the $n^{th}$ column is reduced by an absolute value of the target grayscale conversion value and then determined as the target grayscale value of the sub-pixel in the $m^{th}$ row and in the $n^{th}$ column. For example, taking the red sub-pixel R21 in the first column as an example, the original grayscale value of 255 of 8 bits corresponding to the red sub-pixel R21 is reduced by $|-15|$, so it is changed to a grayscale value of 240, that is, the target grayscale value of the red sub-pixel R21 is the grayscale value of 240. Taking the green sub-pixel G21 in the second column as an example, the original grayscale value of 255 of 8 bits corresponding to the green sub-pixel G21 is reduced by $|-15|$, so it is changed to a grayscale value of 240, i.e., the target grayscale value of the green sub-pixel G21 is the grayscale value of 240.

With reference to FIGS. 2*b*, 10 and 11, the following description will be given by taking an example in which the target grayscale value corresponding to a data voltage input to the red sub-pixel R11 is the grayscale value of 0, and the original grayscale values corresponding to the red sub-pixels R21 to R51 are the grayscale value of 255.

The target grayscale value corresponding to the red sub-pixel R11 is the grayscale value of 0, and the original grayscale value corresponding to the red sub-pixel R21 is the grayscale value of 255, then the grayscale difference between the target grayscale value corresponding to the red sub-pixel R11 and the original grayscale value corresponding to the red sub-pixel R21 is 255, which is greater than a preset threshold (for example, the preset threshold is 3), the grayscale value of 0 of 8 bits is converted into the grayscale value of 0 of 10 bits, the grayscale value of 255 of 8 bits is converted into the grayscale value of 1023 of 10 bits, it can be found from FIG. 10 that the target lookup grayscale value is 450, and the first grayscale conversion value Z11 corresponding to the red sub-pixel R21 can be calculated as follows: $Z11=(450-512)/4=-15.5$, the original grayscale value corresponding to the red sub-pixel R21 of 255 of 8 bits is reduced by $|-15|$, and it is changed into a grayscale value of 240, that is, the target grayscale value of the red sub-pixel R21 is the grayscale value of 240. In this way, a data voltage corresponding to the grayscale value of 240 may be input to the data line, so that the red sub-pixel R21 is input with a corresponding data voltage.

The target grayscale value corresponding to the red sub-pixel R21 is the grayscale value of 240, and the original grayscale value corresponding to the red sub-pixel R31 is the grayscale value of 255, then the grayscale difference between the target grayscale value corresponding to the red sub-pixel R21 and the original grayscale value corresponding to the red sub-pixel R31 is 15, which is greater than the preset threshold (for example, the preset threshold is 3), the grayscale value of 240 of 8 bits is converted into the grayscale value of 960 of 10 bits, the grayscale value of 255 of 8 bits is converted into the grayscale value of 1023 in 10 bits, then it can be found from FIG. 10 that the target lookup grayscale value is 508, then the first grayscale conversion value Z11 corresponding to the red sub-pixel R21 can be calculated as follows: $Z11=(508-512)/4=-1$, the original grayscale value of 255 of 8 bits corresponding to the red sub-pixel R31 is reduced by $|-1|$, and it is changed to a grayscale value of 254, that is, the target grayscale value of the red sub-pixel R31 is the grayscale value of 254. In this way, a data voltage corresponding to the grayscale value of 254 is input to the data line, so that the red sub-pixel R31 is input with a corresponding data voltage.

The target grayscale value corresponding to the red sub-pixel R31 is the grayscale value of 254, and the original grayscale value corresponding to the red sub-pixel R41 is the grayscale value of 255, then a grayscale difference between the target grayscale value corresponding to the red sub-pixel R31 and the original grayscale value corresponding to the red sub-pixel R41 is 1, which is not greater than the preset threshold (for example, the preset threshold is 3), and the original grayscale value corresponding to the red sub-pixel R41, that is, the grayscale value of 255, may be directly used as the target grayscale value of the red sub-pixel R41. Thus, a data voltage corresponding to the grayscale value of 255 may be input to the data line, so that the red sub-pixel R41 is input with a corresponding data voltage.

The target grayscale value corresponding to the red sub-pixel R41 is the grayscale value of 255, and the original grayscale value corresponding to the red sub-pixel R51 is the grayscale value of 255, then a grayscale difference between the target grayscale value corresponding to the red sub-pixel R41 and the original grayscale value corresponding to the red sub-pixel R51 is 0, which is not greater than the preset threshold (for example, the set threshold is 3), the original grayscale value corresponding to the red sub-pixel R51, that is, the grayscale value of 255, can be directly used as the target grayscale value. In this way, a data voltage corresponding to the grayscale value of 255 may be input to the data line, so that the red sub-pixel R51 is input with a corresponding data voltage.

The same is true for the rest sub-pixels, which is not described herein again.

At the step S300, inputting data voltages to data lines in the display panel according to the target grayscale values of the sub-pixels in the $m^{th}$ row so as to input corresponding data voltages to the sub-pixels in the $m^{th}$ row.

For example, for the red sub-pixel R21 in the second row, according to the target grayscale value corresponding to the red sub-pixel R21 determined as above, a data voltage corresponding to the target grayscale value may be input to the data line, so that the data voltage corresponding to the target grayscale value is input to the red sub-pixel R21. For the green sub-pixel G21 in the second row, according to the target grayscale value corresponding to the green sub-pixel G21 determined as above, a data voltage corresponding to the target grayscale value is input to the data line, so that the data voltage corresponding to the target grayscale value is input to the green sub-pixel G21. For the blue sub-pixel B21 in the second row, according to the target grayscale value corresponding to the blue sub-pixel B21 determined as above, a data voltage corresponding to the target grayscale value is input to the data line, so that the data voltage corresponding to the target grayscale value is input to the blue sub-pixel B21. The same is true for the rest sub-pixels, which is not described herein.

In some implementations of the present disclosure, in a case that the absolute value of the grayscale difference corresponding to the $n^{th}$ column is greater than the preset threshold, it indicates that the afterimage is likely to occur, in this case, the original grayscale value of the sub-pixel in the $m^{th}$ row and in the $n^{th}$ column may be reduced and then determined as the target grayscale value of the sub-pixel in the $m^{th}$ row and in the $n^{th}$ column, so that the data voltage corresponding to the reduced grayscale value is input to the sub-pixel in the $m^{th}$ row and in the $n^{th}$ column, and the problem of line afterimage can be solved. Taking an example that the red sub-pixel R21 is input with a positive data voltage in the display frame F_n and is input with a negative data voltage in the display frame F_n+1, in combination with FIG. 6, V1' represents the data voltage, corresponding to the grayscale value obtained by reducing the original grayscale value, input to the red sub-pixel R21 in the display frame F_n, V1 represents the data voltage, corresponding to the original grayscale value, input to the red sub-pixel R21 in the display frame F_n in the prior art, V18' represents the data voltage, corresponding to the grayscale value obtained by reducing the original grayscale value, input to the red sub-pixel R21 in the display frame F_n+1, and V18 represents the data voltage, corresponding to the original grayscale value, input to the red sub-pixel R21 in the display frame F_n+1 in the prior art. As can be seen from FIG. 6, Tr2 is smaller than Tr1, and Tf2 is smaller than Tf1, so that an absolute value of Tr2−Tf2 is smaller than an absolute value of Tr1−Tf1, therefore, a difference between Tr2 and Tf2 is reduced, a difference between charging rates of the red sub-pixel R21 in the display frames F_n and F_n+1 is reduced, a DC bias voltage is reduced, and the line afterimage is alleviated.

In some implementations of the present disclosure, the timing controller may determine the original grayscale value of each sub-pixel in the $m^{th}$ row and the target grayscale value corresponding to the data voltage input to each sub-pixel in the $(m-1)^{th}$ row; determine a target grayscale value of each sub-pixel in the $m^{th}$ row according to the original grayscale value of the sub-pixel in the $m^{th}$ row and the target grayscale value of the sub-pixel in the $(m-1)^{th}$ row and in the same column as the sub-pixel in the $m^{th}$ row; and provide the determined target grayscale value to a source driving circuit. In addition, the source driving circuit may input the data voltage to the data line in the display panel according to the target grayscale value of each sub-pixel in the $m^{th}$ row, so that each sub-pixel in the $m^{th}$ row is input with a corresponding data voltage.

In the embodiment of the disclosure, the timing controller may determine, for the $n^{th}$ column, a grayscale difference between the original grayscale value corresponding to the sub-pixel in the $m^{th}$ row and the target grayscale value corresponding to the sub-pixel in the $(m-1)^{th}$ row. In a case where an absolute value of the grayscale difference corresponding to the $n^{th}$ column is larger than a preset threshold, the original grayscale value of the sub-pixel in the $m^{th}$ row and in the $n^{th}$ column is reduced according to the original grayscale value of the sub-pixel in the $m^{th}$ row and in the $n^{th}$ column, the target grayscale value of the sub-pixel in the $(m-1)^{th}$ row and in the $n^{th}$ column and the target lookup grayscale value in the pre-stored target lookup table and then determined as the target grayscale value of the sub-pixel in the $m^{th}$ row after being. In a case where the absolute value of the grayscale difference corresponding to the $n^{th}$ column is not larger than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

An embodiment of the present disclosure provides other methods for driving a display panel, which are modified from the embodiments in the foregoing embodiments. Only the differences between the present embodiment and the above embodiment will be described below, and the same parts will not be described herein again.

In the embodiment of the present disclosure, in case where the absolute value of the grayscale difference corresponding to the $n^{th}$ column is not greater than the preset threshold, a compensation voltage for the sub-pixel in the $m^{th}$ row and in the $n^{th}$ column is determined according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table. The inputting the data voltages to the data lines in the display panel according to the target grayscale value of each sub-pixel in the $m^{th}$ row includes: loading the compensation voltage corresponding to the sub-pixel in the $m^{th}$ row and in the $n^{th}$ column to the data line connected with the sub-pixel in the $m^{th}$ row and in the $n^{th}$ column while inputting a data voltage to the data line connected with the sub-pixel in the $m^{th}$ row and in the $n^{th}$ column according to the target grayscale value of the sub-pixel in the $m^{th}$ row and in the $n^{th}$ column. For example, in a case where the absolute value of the grayscale difference corresponding to the $n^{th}$ column is not greater than the preset threshold, the timing controller may determine the compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table, and output the compensation voltage to the source driving circuit, and the source driving circuit loads the compensation voltage corresponding to the sub-pixel in the $m^{th}$ row and in the $n^{th}$ column to the data line connected with the sub-pixel in the $m^{th}$ row and in the $n^{th}$ column, while inputting the data voltage to the data line connected with the sub-pixel in the $m^{th}$ row and in the $n^{th}$ column according to the target grayscale value of the sub-pixel in the $m^{th}$ row and in the $n^{th}$ column. Therefore, a difference between the data voltage input to the sub-pixel and a common electrode voltage is larger than a difference between the data voltage corresponding to the original grayscale value and the common electrode voltage, so that the charging rate of the sub-pixel can be improved by using an overdrive mode, the difference of the charging rates is further reduced, and the line afterimage is further alleviated.

In the embodiment of the present disclosure, the determining the compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table include the following procedures.

Firstly, the overdrive lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column is determined in the overdrive lookup table.

For example, referring to FIG. 2*b* and FIG. 11, in a case where the number of bits of grayscale corresponding to the display panel is 8 bits and the number of bits of grayscale corresponding to the target lookup table is 10 bits, taking the red sub-pixels R11 and R21 in the first column as an example, if the target grayscale value Lmr11 corresponding to the red sub-pixel R11 is a grayscale value of 0 of 8 bits and is converted into a grayscale value of 0 of 10 bits, and the original grayscale value corresponding to the red sub-pixel R21 is the grayscale value of 255 of 8 bits and is converted into a grayscale value of 1023 of 10 bits, it can be found from FIG. 11 that the grayscale value of 0 and the grayscale value of 1023 correspond to 512, so that the overdrive lookup grayscale value is 512. Taking the green sub-pixels G11 and G21 in the second column as an example, if the target grayscale value Lmg11 corresponding to the green sub-pixel G11 is the grayscale value of 0 of 8 bits and is converted into the grayscale value of 0 of 10 bits, and the original grayscale value Lyg21 corresponding to the green sub-pixel G21 is the grayscale value of 255 of 8 bits and is converted into the grayscale value of 1023 of 10 bits, it can be found from FIG. 11 that the grayscale value of 0 and the grayscale value of 1023 correspond to 512, so that the overdrive lookup grayscale value is 512. The same is true for the rest sub-pixels, which is not described herein again.

Secondly, a target overdrive grayscale conversion value corresponding to the sub-pixel in the $m^{th}$ row and in the $n^{th}$ column is determined according to the determined overdrive lookup grayscale value, a third setting value and a fourth setting value. For example, determining the target overdrive grayscale conversion value corresponding to the sub-pixel in the $m^{th}$ row and in the $n^{th}$ column according to the determined overdrive lookup grayscale value, the third setting value, and the fourth setting value may include: determining a second grayscale conversion value corresponding to the sub-pixel in the $m^{th}$ row and in the $n^{th}$ column according to the determined overdrive lookup grayscale value, the third setting value and the fourth setting value by adopting a formula of $Z21=(Y21-A22)/A21$; and rounding the second grayscale conversion value according to a rounding rule to determine a target overdrive grayscale conversion value. Z21 represents the second grayscale conversion value, Y21 represents the overdrive lookup grayscale value, A22 represents the fourth setting value, A21 represents the third setting value, and $A21=2^k$ (k represents a difference between the number of bits of grayscale corresponding to the overdrive lookup table and the number of bits of grayscale corresponding to the display panel). In the embodiment of the present disclosure, the fourth setting value may be a prestored value, or may alternatively be a value obtained from a lookup table, which is not limited herein.

For example, if the number of bits of grayscale corresponding to the target lookup table is 10 bits and the number of bits of grayscale corresponding to the display panel is 8 bits, then A22=4, and $Z21=(Y21-A22)/4$. Taking the overdrive lookup grayscale value corresponding to the red sub-pixel R21 in the first column being 512 and the fourth setting value being 504 as an example, the second grayscale conversion value corresponding to the red sub-pixel R21 can be calculated as follows: $Z21=(512-504)/4=2$. Taking the overdrive lookup grayscale value of the green sub-pixel G21 in the second column being 512 and the fourth setting value being 508 as an example, the second grayscale conversion value corresponding to the green sub-pixel G21 can be calculated as follows: $Z21=(512-504)/4=2$. It should be noted that, in a case where Z21 is an integer, Z21 can be directly used as the target overdrive grayscale conversion value. In a case where Z21 is a decimal, it may be rounded to take the rounded integer as the target overdrive grayscale conversion value. Alternatively, in a case where Z21 is a decimal, the numerical value following the decimal point may be directly discarded, and the integral part may be directly used as the target overdrive grayscale conversion value.

Thirdly, a data voltage corresponding to an absolute value of the target overdrive grayscale conversion value of the sub-pixel in the $m^{th}$ row and in the $n^{th}$ row is determined as the compensation voltage corresponding to the sub-pixel in the $m^{th}$ row and in the $n^{th}$ row. For example, taking the red sub-pixel R21 in the first column as an example, if the absolute value $|2|$ of the target overdrive grayscale conversion value is a grayscale value of 2 in 8 bits, a data voltage corresponding to the grayscale value of 2 may be used as the compensation voltage corresponding to the red sub-pixel R21. Taking the green sub-pixel G21 in the second column as an example, if the absolute value $|2|$ of the target overdrive grayscale conversion value is a grayscale value of 2 of 8 bits, a data voltage corresponding to the grayscale value of 2 may be used as the compensation voltage corresponding to the green sub-pixel G21.

For example, in the embodiment of the present disclosure, as shown in FIG. 8, the timing controller includes not only the image quality function processing module 210, but also an original grayscale processing module 220 and an overdrive processing module 230. The image quality function processing module 210 is configured to reduce, in a case where the absolute value of the grayscale difference corresponding to the $n^{th}$ column is greater than the preset threshold, the original grayscale value of the sub-pixel in $m^{th}$ row and in the $n^{th}$ column according to the original grayscale value of the sub-pixel in $m^{th}$ row and in the $n^{th}$ column, the target grayscale value of the sub-pixel in the $(m-1)^{th}$ row and in the $n^{th}$ column and the target lookup grayscale value in the pre-stored target lookup table and then determine the reduced original grayscale value of the sub-pixel in $m^{th}$ row and in the $n^{th}$ column as the target grayscale value of the sub-pixel in $m^{th}$ row and in the $n^{th}$ column. The original grayscale processing module 220 is configured to determine, in a case where the absolute value of the grayscale difference corresponding to the $n^{th}$ column is not greater than the preset threshold, the original grayscale value of the sub-pixel in the $m^{th}$ row and in the $n^{th}$ column as the target grayscale value of the sub-pixel in the $m^{th}$ row and in the $n^{th}$ column. The overdrive processing module 230 is configured to store the overdrive lookup table and determine, in a case where the absolute value of the grayscale difference corresponding to the $n^{th}$ column is not greater than the preset threshold, a compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the (m−1)$^{th}$ row and in the n$^{th}$ column, and the overdrive lookup grayscale value in the pre-stored overdrive lookup table. It should be noted that the specific implementation process of the timing controller may be substantially the same as the implementation process in the driving method, and is not described herein again.

An embodiment of the present disclosure provides another method for driving a display panel, which is modified from the embodiments in the above embodiments. Only the difference between the present embodiment and the above embodiments will be described below, and the same parts will not be described herein again.

Figure 9:
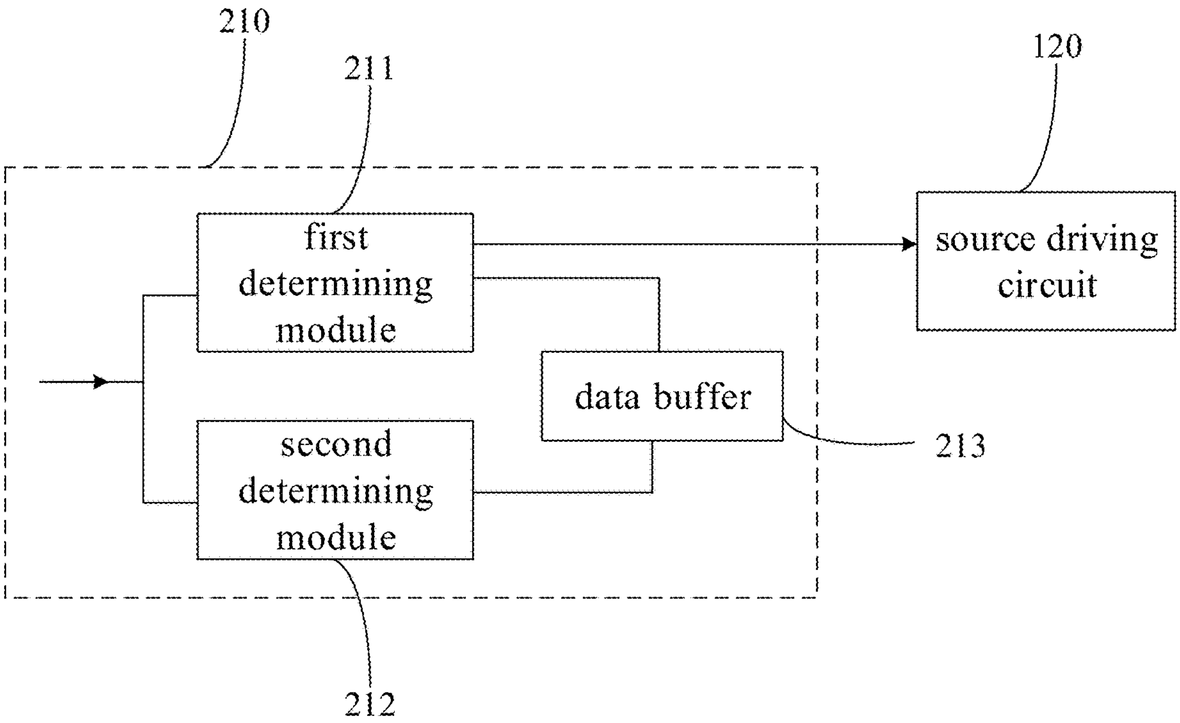
FIG. 9 is a schematic structural diagram of an image quality function processing module according to an embodiment of the present disclosure.

In the embodiment of the present disclosure, two target lookup tables may be stored in the image quality function processing module 210 of the timing controller. Illustratively, as shown in FIG. 9, the image quality function processing module 210 includes: a first determining module 211, a second determining module 212, and a data buffer 213. The first determining module 211 is configured to store one of the two target lookup tables, and reduce the original grayscale value of the sub-pixel in the m$^{th}$ row and in the n$^{th}$ column according to the original grayscale value of the sub-pixel in the m$^{th}$ row and in the n$^{th}$ column, the target grayscale value of the sub-pixel in the (m−1)$^{th}$ row and in the n$^{th}$ column, and the target lookup grayscale value in the pre-stored target lookup table and then determine the reduced original grayscale value of the sub-pixel in the m$^{th}$ row and in the n$^{th}$ column as the target grayscale value of the sub-pixel in the m$^{th}$ row and in the n$^{th}$ column, and provide the determined target grayscale value to a source driving circuit, where n is an integer greater than 0.

The second determining module 212 is configured to: store the other of the two target lookup tables; reduce the original grayscale value of the sub-pixel in the m$^{th}$ row and in the n$^{th}$ column according to the original grayscale value of the sub-pixel in the m$^{th}$ row and in the n$^{th}$ column, the target grayscale value of the sub-pixel in the (m−1)$^{th}$ row and in the n$^{th}$ column, and the target lookup grayscale value in the pre-stored target lookup table and determine the reduced original grayscale value of the sub-pixel in the m$^{th}$ row and in the n$^{th}$ column as the target grayscale value of the sub-pixel in the m$^{th}$ row and in the n$^{th}$ column; and provide the determined target grayscale value to the data buffer 213.

Furthermore, the data buffer 213 is configured to store the target grayscale value output by the second determination module 212.

In the embodiment of the present disclosure, the first determination module 211 is further configured to obtain the target grayscale value corresponding to the data voltage input to each sub-pixel in the (m−1)$^{th}$ row from the data buffer 213. The second determination module 212 is further configured to obtain the target grayscale value corresponding to the data voltage input to each sub-pixel in the (m−1)$^{th}$ row from the data buffer 213.

In the embodiment of the present disclosure, the display device may be any product or component with a display function, such as a mobile phone, a tablet computer, a television, a display, a notebook computer, a digital photo frame, a navigator and the like. Other essential components of the display device are understood by those skilled in the art, and are not described herein nor should they be construed as limiting the present disclosure.

As will be appreciated by one skilled in the art, the embodiments of the present disclosure may be provided as a method, a system, or a computer program product. Accordingly, the present disclosure may take the form of an embodiment of a complete hardware, an embodiment of a complete software or an embodiment combining software and hardware aspects. Furthermore, the present disclosure may take the form of a computer program product embodied on one or more computer-usable storage medium (including, but not limited to, disk storage, CD-ROM, optical storage, and the like) having computer-usable program code embodied therein.

The present disclosure is described with reference to flowcharts and/or block diagrams of the methods, the apparatus (systems), and the computer program product according to the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatus, create means for implementing the functions specified in one or more flows in the flowchart and/or one or more blocks in the block diagram.

These computer program instructions may alternatively be stored in a computer-readable memory that can direct a computer or other programmable data processing apparatus to operate in a specific manner, such that the instructions stored in the computer-readable memory produce a product including an instruction mean which implement the function specified in one or more flows in the flowchart and/or one or more blocks in the block diagram.

These computer program instructions may alternatively be loaded onto a computer or other programmable data processing apparatus to cause a series of operation steps to be performed on the computer or other programmable apparatus to produce a computer implemented process such that the instructions which are executed on the computer or other programmable apparatus provide steps for implementing the functions specified in one or more flows in the flowchart and/or one or more blocks in the block diagram.

It will be apparent to those skilled in the art that various changes and modifications may be made in the present disclosure without departing from the spirit and scope of the present disclosure. Thus, if such changes and modifications of the present disclosure fall within the scope of the claims of the present disclosure and their equivalents, the present disclosure is intended to include such modifications and changes as well.

What is claimed is:

1. A method for driving a display panel, comprising:

acquiring an original grayscale value of each sub-pixel in an m$^{th}$ row and a target grayscale value corresponding to a data voltage input to each sub-pixel in an (m−1)$^{th}$ row, where m is an integer greater than 1, and the display panel adopts a column inversion driving mode;

in a case where, in a same column, the original grayscale value of the sub-pixel in the m$^{th}$ row is larger than the target grayscale value corresponding to the data voltage input to the sub-pixel in the (m−1)$^{th}$ row, determining a target grayscale value of each sub-pixel in the m$^{th}$ row according to the original grayscale value of the sub-pixel in the m$^{th}$ row and the target grayscale value of the sub-pixel in the (m−1)$^{th}$ row in a same column as the sub-pixel in the m$^{th}$ row; and inputting a data voltage to a data line in the display panel according to the target grayscale value of each sub-pixel in the $m^{th}$ row so as to charge a corresponding data voltage into each sub-pixel in the $m^{th}$ row, wherein the determining the target grayscale value of each sub-pixel in the $m^{th}$ row according to the original grayscale value of the sub-pixel in the $m^{th}$ row and the target grayscale value of the sub-pixel in the $(m-1)^{th}$ row in the same column as the sub-pixel in the $m^{th}$ row comprises:

determining, for an $n^{th}$ column, a grayscale difference between the original grayscale value of the sub-pixel in the $m^{th}$ row and the target grayscale value of the sub-pixel in the $(m-1)^{th}$ row, where n is an integer greater than 0;

in a case where an absolute value of the grayscale difference corresponding to the $n^{th}$ column is larger than a preset threshold, reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and a target lookup grayscale value in a pre-stored target lookup table and determining the reduced original grayscale value as a target grayscale value of the sub-pixel in the $m^{th}$ row and in the $n^{th}$ column; wherein the target look-up table comprises: a plurality of first grayscale values different from each other, a plurality of second grayscale values different from each other and target lookup grayscale values each corresponding to any one of the first grayscale values and any one of the second grayscale values.

2. The method according to claim 1, wherein the preset threshold is greater than 1 and less than or equal to a maximum grayscale value.

3. The method according to claim 1, wherein the reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the target lookup grayscale value in a pre-stored target lookup table and determining the reduced original grayscale value as the target grayscale value of the sub-pixel in the $m^{th}$ row and in the $n^{th}$ column comprises:

determining, in the target lookup table, a target lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column;

determining a target grayscale conversion value corresponding to the sub-pixel in the $m^{th}$ row and in the $n^{th}$ row according to the determined target lookup grayscale value, a first setting value and a second setting value; and reducing the original grayscale value of the sub-pixel in the $m^{th}$ row and in the $n^{th}$ column by an absolute value of the target grayscale conversion value, and determining the reduced original grayscale value of the sub-pixel in the $m^{th}$ row and in the $n^{th}$ column as the target grayscale value of the sub-pixel in the $m^{th}$ row and in the $n^{th}$ column.

4. The method according to claim 3, wherein the determining the target grayscale conversion value corresponding to the sub-pixel in the $m^{th}$ row and in the $n^{th}$ row according to the determined target lookup grayscale value, the first setting value and the second setting value comprises:

determining a first grayscale conversion value corresponding to the sub-pixel in the $m^{th}$ row and in the $n^{th}$ column according to the determined target lookup grayscale value, the first setting value and the second setting value by adopting the following formula;

$$Z11 = (Y11 - A11)/A12;$$

where Z11 represents the first grayscale conversion value, Y11 represents the target lookup grayscale value, A11 represents the first setting value, A12 represents the second setting value, $A12=2^k$, k representing a difference between the number of bits of grayscale corresponding to the target lookup table and the number of bits of grayscale corresponding to the display panel, and Y11 is less than or equal to A11; and rounding the first grayscale conversion value according to a rounding rule to determine the target grayscale conversion value.

5. The method according to claim 4, wherein an overdrive lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column is determined from a pre-stored overdrive lookup table, and the determined overdrive lookup grayscale value is determined as the first setting value, and the overdrive lookup table comprises: a plurality of first grayscale values different from each other, a plurality of second grayscale values different from each other, and overdrive lookup grayscale values each corresponding to any one of the first grayscale values and any one of the second grayscale values.

6. The method according to claim 5, wherein in a case where the absolute value of the grayscale difference corresponding to the $n^{th}$ column is not greater than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

7. The method according to claim 6, further comprising in a case where the absolute value of the grayscale difference corresponding to the $n^{th}$ column is not greater than the preset threshold, determining a compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table;

wherein the inputting the data voltage to the data line in the display panel according to the target grayscale value of each sub-pixel in the $m^{th}$ row comprises:

loading the compensation voltage corresponding to the sub-pixel in the $m^{th}$ row and in the $n^{th}$ column to the data line connected with the sub-pixel in the $m^{th}$ row and in the $n^{th}$ column while inputting the data voltage to the data line connected with the sub-pixel in the $m^{th}$ row and in the $n^{th}$ column according to the target grayscale value of the sub-pixel in the $m^{th}$ row and in the $n^{th}$ column.

8. The method according to claim 7, wherein the determining the compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and the overdrive lookup grayscale value in the pre-stored overdrive lookup table comprises:

determining, in the overdrive lookup table, the overdrive lookup grayscale value corresponding to the original grayscale value of the sub-pixel in the $m^{th}$ row and in the $n^{th}$ column and the target grayscale value of the sub-pixel in the $(m-1)^{th}$ row and in the $n^{th}$ column;

determining a target overdrive grayscale conversion value corresponding to the sub-pixel in the $m^{th}$ row and in the $n^{th}$ column according to the determined overdrive lookup grayscale value, a third setting value and a fourth setting value; and determining a data voltage corresponding to an absolute value of the target overdrive grayscale conversion value of the sub-pixel in the $m^{th}$ row and in the $n^{th}$ column as the compensation voltage corresponding to the sub-pixel in the $m^{th}$ row and in the $n^{th}$ column.

9. The method according to claim 8, wherein the determining the target overdrive grayscale conversion value corresponding to the sub-pixel in the $m^{th}$ row and in the $n^{th}$ column according to the determined overdrive lookup grayscale value, the third setting value and the fourth setting value comprises:

determining a second grayscale conversion value corresponding to the sub-pixel in the $m^{th}$ row and in the $n^{th}$ column according to the determined overdrive lookup grayscale value, the third setting value and the fourth setting value by adopting the following formula;

$$Z21=(Y21-A22)/A21;$$

where Z21 represents the second grayscale conversion value, Y21 represents the overdrive lookup grayscale value, A22 represents the fourth setting value, A21 represents the third setting value, and $A21=2^k$, k representing a difference between the number of bits of grayscale corresponding to the overdrive lookup table and the number of bits of grayscale corresponding to the display panel; and rounding the second grayscale conversion value according to a rounding rule to determine the target overdrive grayscale conversion value.

10. The method according to claim 1, wherein the acquiring the original grayscale value of each sub-pixel in the $m^{th}$ row comprises:

receiving an original display data of each sub-pixel in the $m^{th}$ row; and determining the original grayscale value of the sub-pixel in the $m^{th}$ row according to the original display data of the sub-pixel in the $m^{th}$ row.

11. A display device, comprising:

a display panel comprising a source driving circuit; and a timing controller configured to: determine an original grayscale value of each sub-pixel in an $m^{th}$ row and a target grayscale value corresponding to a data voltage charged into each sub-pixel in an $(m-1)^{th}$ row; determine, in a case where the original grayscale value of the sub-pixel in the $m^{th}$ row is larger than the target grayscale value corresponding to the data voltage charged into the sub-pixel in the $(m-1)^{th}$ row in a same column as the sub-pixel in the $m^{th}$ row, a target grayscale value of the sub-pixel in the $m^{th}$ row according to the original grayscale value of the sub-pixel in the $m^{th}$ row and the target grayscale value of the sub-pixel in the $(m-1)^{th}$ row in a same column as the sub-pixel in the $m^{th}$ row; and provide the determined target grayscale value to the source driving circuit, where m is an integer greater than 1, and the display panel adopts a column inversion driving mode;

wherein the source driving circuit is configured to: input a data voltage to a data line in the display panel according to the target grayscale value of each sub-pixel in the $m^{th}$ row so as to charge a corresponding data voltage into the sub-pixel in the $m^{th}$ row, wherein the timing controller stores at least one target lookup table and an overdrive lookup table;

the at least one target lookup table each comprises: a plurality of first grayscale values different from each other, a plurality of second grayscale values different from each other, and target lookup grayscale values each corresponding to any one of the first grayscale values and any one of the second grayscale values;

the overdrive lookup table comprises: a plurality of first grayscale values different from each other, a plurality of second grayscale values different from each other and overdrive lookup grayscale values each corresponding to any one of the first grayscale values and any one of the second grayscale values, and wherein the at least one target lookup table comprises two target lookup tables;

the timing controller comprises a data buffer and is configured to: store one of the two target lookup tables; reduce the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column and the target lookup grayscale value in the target lookup table stored in advance and determine the reduced original grayscale value of the sub-pixel in the $m^{th}$ row and in the $n^{th}$ column as a target grayscale value of the sub-pixel in the $m^{th}$ row and in the $n^{th}$ column; and provide the determined target grayscale value to the source driving circuit, where n is an integer greater than 0;

the timing controller is further configured to: store the other of the two target lookup tables, reducing the original grayscale value of the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column and a target lookup grayscale value in the target lookup table stored in advance and determine the reduced original grayscale value of the sub-pixel in the $m^{th}$ row and in the $n^{th}$ column as a target grayscale value of the sub-pixel in the mt row and in the $n^{th}$ column; and provide the determined target grayscale value to the data buffer; and the data buffer is configured to store the target grayscale value.

12. The display device according to claim 11, wherein the timing controller is further configured to acquire the target grayscale value corresponding to the data voltage charged into each sub-pixel in the $(m-1)^{th}$ row in the data buffer; and the timing controller is further configured to acquire the target grayscale value corresponding to the data voltage charged into each sub-pixel in the $(m-1)^{th}$ row in the data buffer.

13. The display device according to claim 12, wherein the timing controller is further configured to determine, in a case where an absolute value of a grayscale difference corresponding to the $n^{th}$ row is not greater than a preset threshold, the original grayscale value of the sub-pixel in the $m^{th}$ row and in the $n^{th}$ column as the target grayscale value corresponding to the sub-pixel in the $m^{th}$ row and in the $n^{th}$ column, wherein the grayscale difference corresponding to the $n^{th}$ row is a difference between the original grayscale value of the sub-pixel in the $m^{th}$ row and in the $n^{th}$ column and the target grayscale value of the sub-pixel in the $(m-1)^{th}$ row and in the $n^{th}$ column.

14. The display device according to claim 13, wherein the timing controller is further configured to: store the overdrive lookup table; determine, in a case where the absolute value of the grayscale difference corresponding to the $n^{th}$ column is not greater than the preset threshold, a compensation voltage corresponding to the sub-pixel in the $m^{th}$ row and in the $n^{th}$ column according to the original grayscale value of the sub-pixel in the $m^{th}$ row and in the $n^{th}$ column, the target grayscale value of the sub-pixel in the $(m-1)^{th}$ row and in the $n^{th}$ column, and an overdrive lookup grayscale value in the overdrive lookup table stored in advance; and the source driving circuit is configured to load the compensation voltage corresponding to the sub-pixel in the $m^{th}$ row and in the $n^{th}$ column to the data line connected with the sub-pixel in the $m^{th}$ row and in the $n^{th}$ column while inputting the data voltage to the data line connected with the sub-pixel in the $m^{th}$ row and in the $n^{th}$ column according to the target grayscale value of the sub-pixel in the $m^{th}$ row and in the $n^{th}$ column.

15. The method according to claim 1, wherein in a case where the absolute value of the grayscale difference corresponding to the $n^{th}$ column is not greater than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

16. The method according to claim 2, wherein in a case where the absolute value of the grayscale difference corresponding to the $n^{th}$ column is not greater than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

17. The method according to claim 3, wherein in a case where the absolute value of the grayscale difference corresponding to the $n^{th}$ column is not greater than the preset threshold, the original grayscale value of the sub-pixel in the $m^{th}$ row and in the $n^{th}$ column is determined as the target grayscale value corresponding to the sub-pixel in the $m^{th}$ row and in the $n^{th}$ column.

* * * * *